US008612942B2

(12) United States Patent
Oda et al.

(10) Patent No.: US 8,612,942 B2
(45) Date of Patent: Dec. 17, 2013

(54) SYSTEM FOR DEBUGGING COMPUTER PROGRAM

(75) Inventors: Yuichi Oda, Kanagawa-ken (JP); Takashi Miura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 984 days.

(21) Appl. No.: 12/483,675

(22) Filed: Jun. 12, 2009

(65) Prior Publication Data

US 2009/0319994 A1 Dec. 24, 2009

(30) Foreign Application Priority Data

Jun. 20, 2008 (JP) .................................. 2008-162358

(51) Int. Cl.
*G06F 9/44* (2006.01)

(52) U.S. Cl.
USPC ............................ 717/134; 717/124; 717/135

(58) Field of Classification Search
USPC .................................................. 717/124–135
See application file for complete search history.

(56) References Cited

U.S. PATENT DOCUMENTS

| | | | | |
|---|---|---|---|---|
| 3,848,234 A | * | 11/1974 | MacDonald .................... | 711/119 |
| 4,954,942 A | * | 9/1990 | Masuda et al. ................. | 717/134 |
| 5,768,591 A | * | 6/1998 | Robinson ........................ | 717/124 |
| 5,809,562 A | * | 9/1998 | Gaskins et al. ................ | 711/207 |
| 5,845,125 A | * | 12/1998 | Nishimura et al. ............ | 717/129 |
| 6,286,132 B1 | * | 9/2001 | Tanaka et al. .................. | 717/125 |
| 6,385,697 B1 | * | 5/2002 | Miyazaki ....................... | 711/128 |
| 2003/0028860 A1 | * | 2/2003 | Sumida et al. ................. | 717/125 |
| 2003/0093771 A1 | * | 5/2003 | Ogawa et al. .................. | 717/125 |
| 2006/0059470 A1 | * | 3/2006 | Kurapati ......................... | 717/128 |
| 2007/0033577 A1 | * | 2/2007 | Arackal .......................... | 717/124 |
| 2008/0127120 A1 | * | 5/2008 | Kosche et al. ................. | 717/131 |
| 2009/0031289 A1 | * | 1/2009 | Michael ......................... | 717/124 |

FOREIGN PATENT DOCUMENTS

JP 5-289904 11/1993

OTHER PUBLICATIONS

Office Action issued Jul. 6, 2012 in Japanese Application No. 2008-162358 (With English Translation).
SuperH RISC Engine simulator/Debugger User's Manual, RJJ10B0218-0400, Renesas (Jul. 25, 2007), 6 pages.

* cited by examiner

*Primary Examiner* — Don Wong
*Assistant Examiner* — Mohammad Kabir
(74) *Attorney, Agent, or Firm* — Oblon, Spivak, McClelland, Maier & Neustadt, L.L.P.

(57) ABSTRACT

First tag addresses and data are stored in association with first index addresses in a memory cell unit provided in a cache memory. The first tag addresses and the first index addresses are configured based on address information respectively. Designation address information is provided to designate an address to read one of the stored data. The designation address information is converted to a second index address and second tag address by an address converter, in order to read the one of the stored data according to the designation address information. The memory cell unit is accessed according to the obtained second index address. When one of the first tag addresses matches the second tag address, the one of the data corresponding to the one of the first tag addresses is read. The designation address information and the one of the data are displayed in a cache memory display unit.

20 Claims, 16 Drawing Sheets

SYSTEM FOR DEBUGGING COMPUTER PROGRAM

CROSS REFERENCE TO RELATED APPLICATION

This application is based upon and claims the benefit of priority from the prior Japanese Patent Application No. 2008-162358, filed on Jun. 20, 2008, the entire contents of which are incorporated herein by reference.

FIELD OF THE INVENTION

The invention relates to a system for debugging a computer program which is executed in a computer system equipped with a cache memory.

DESCRIPTION OF THE BACKGROUND

In recent years, many microprocessors have been improved in processing performance by installing an instruction cache memory or data cache memory. The circuit sizes and power consumption of such microprocessors are restricted. Due to the restriction, in many cases, a complicated configuration or complicated control is not adopted for a cache memory of a microprocessor to improve the performance of the cache memory. Instead, in many cases, a circuit for controlling the cache memory is simplified by employing a direct mapping or a 2-way set associative mapping as a scheme associating blocks of a main memory with blocks of the cache memory.

Further, in recent years, multiprocessor systems have been widely used. Such a multiprocessor system need to have a function to keep coherency among cache memories of processors constituting the multiprocessor. The function may be provided by installing hardware in the multiprocessor system. However, the configuration or control of the hardware may be complicated.

In stead of installing such hardware, the coherency of the cache memories can be kept by a computer program which is executed in the multiprocessor system. However, by providing such a function in the computer program, possibility of generation of bugs may increase.

When debugging such a computer program, data stored in a cache memory needs to be analyzed.

As described above, generation of bugs may increase in a computer program for executing a multiprocessor system, by providing a function in the computer program to keep coherency among cache memories of the multiprocessor system. Thus, a debugging function, which may attain easy analysis, is required.

A debugger capable of displaying data stored in a cache memory of a microprocessor is disclosed in "Online User's Manual for SuperH™ RISC engine simulator/debugger," issued on Jul. 25, 2007 by Renesas Technology Corp., and searched on the Internet on Sep. 19, 2007 (URL: http://documentation.renesas.com/jpn/products/tool/rjj10b0218_sh.pdf, pp. 97 to 102).

The debugger that is shown in the above document stores data together with tag address information in the cache memory.

The tag address information and the data stored in the cache memory are displayed in an order of index addresses of the cache memory. Thus, it is difficult to know the relation between the data stored in the cache memory and a main memory address, for example.

SUMMARY OF THE INVENTION

An aspect of the present invention provides a debugging system for debugging a program executed in a processor system equipped with a main memory, a processor equipped with a cache memory having a memory cell unit, and a bus to connect the processor and the main memory, the memory cell unit being capable of storing first tag addresses and data in association with first index addresses, respectively, the first index addresses being configured based on address information, the first tag addresses being configured based on the address information, the debugging system comprising an inputting unit to receive designation address information to designate an address of data to be read, and to receive an instruction to instruct an operation for debugging, a cache memory configuration information inputting unit to receive configuration information of the cache memory, an address converter to convert the designation address information to a second index address and a second tag address on the basis of the configuration information received by the memory configuration information inputting unit, a cache memory reading unit equipped with a first decoder, a comparator and a reader, the first decoder being configured to access to the memory cell unit in reference to the second index address obtained from the address converter, the comparator being configured to compare the second tag address with one of the first tag addresses stored in the memory cell unit and selected by the first decoder, the reader configured to read one of the data corresponding to the one of the first tag addresses stored in the memory cell unit and selected by the first decode, and a cache memory display unit configured to display at least the designation address information and the one of the data read from the cache memory, wherein the cache memory reading unit is configured to read one of the data corresponding to the one of the first tag addresses stored in the memory cell unit and selected by the first decoder, when the one of the first tag addresses stored in the memory cell unit and the second tag address match as a result of comparison by the comparator so that the access to the cache memory results in a cache hit.

Another aspect of the present invention provides a debugging system for debugging a program executed in a processor system equipped with a main memory, a first processor equipped with a first cache memory having a first memory cell unit, a second processor equipped with a second cache memory having a second memory cell unit, and a bus to connect the first and second processors and the main memory, the first memory cell unit being capable of storing first tag addresses and first data in association with first index addresses, respectively, the first index addresses being configured based on address information, the first tag addresses being configured based on the address information, and the second memory cell unit being capable of storing second tag addresses and second data in association with second index addresses, respectively, "the second index addresses being configured based on address information, the second tag addresses being configured based on the address information being used to configure the second index addresses, the debugging system comprising an inputting unit to receive a information to designate the first processor as an processor to be debugged, designation address information to designate an address of a data to be read, and an instruction to instruct an operation for debugging, first and second"cache memory configuration information inputting units configured to receive first and second configuration information of the first and second cache memories, respectively, first and second address converters configured to convert the designation address information to third and fourth index addresses and third and fourth tag addresses, respectively, on the basis of the first and second configuration information received by the first and second memory configuration information inputting units, first and second cache memory reading units respectively equipped with first and second decoders, first and second comparators, and first and second readers, the first and second decoders being configured respectively to access to the first and second memory cell units in reference to the third and fourth index addresses obtained from the first and second address converters, the first and second comparators being configured respectively to compare the third and fourth tag addresses with respective ones the first and second tag addresses stored in the first and second memory cell units and selected by the first and second decoders, and the first and second readers being configured respectively to read respective ones of the first and second data corresponding to the respective ones of the first and second tag addresses stored in the first and second memory cell units and selected by the first and second decoders, a read data comparing unit configured respectively to compare the respective ones of the first and second data read from the first and second readers, and a cache memory display unit configured to display at least the designation address information and the one of the first data read from the first cache memory.

DETAILED DESCRIPTION OF THE INVENTION

Figure 1:
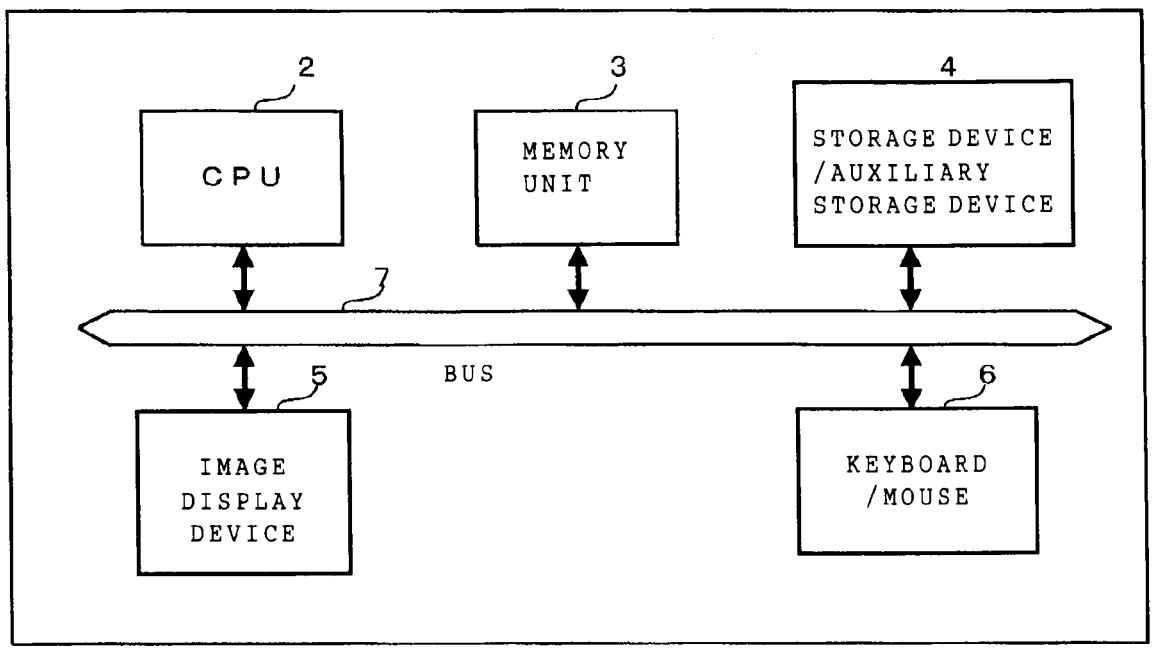
FIG. 1 is a block diagram showing a configuration example of hardware of a computer that operates as a debugging system.

Hereinafter, embodiments of the invention will be described with reference to the drawings. In FIGS. 1 to 20, the same portions are denoted by the same reference numerals respectively.

A first embodiment of a debugging system according to the invention will be described with reference to FIGS. 1 to 8.

FIG. 1 is a block diagram showing a configuration example of hardware of a computer which operates as the debugging system. As shown in FIG. 1, a computer 1 is equipped with a central processing unit (hereinafter referred to as "CPU") 2, a memory unit 3, a storage device/auxiliary storage device 4, an image display device 5, and a keyboard/mouse 6.

The CPU 2 executes a program such as an application program or an operation system (OS). The memory unit 3 stores a program to be executed by the CPU 2 and data. The storage device/auxiliary storage device 4 stores and saves the program and data transmitted to and stored in the memory unit 3.

The image display device 5 displays characters, icons, image information, and the like when the CPU 2 executes a program. The keyboard/mouse 6 performs inputting such as character inputting or position designation when the CPU 2 executes a program.

The CPU 2, the memory unit 3, the storage device/auxiliary storage device 4, the image display device 5, and the keyboard/mouse 6 are connected with each other via a system bus 7 to exchange data, address information, control information, and the like. The storage device/auxiliary storage device 4 may be equipped with a detachable nonvolatile storage medium.

Figure 2:
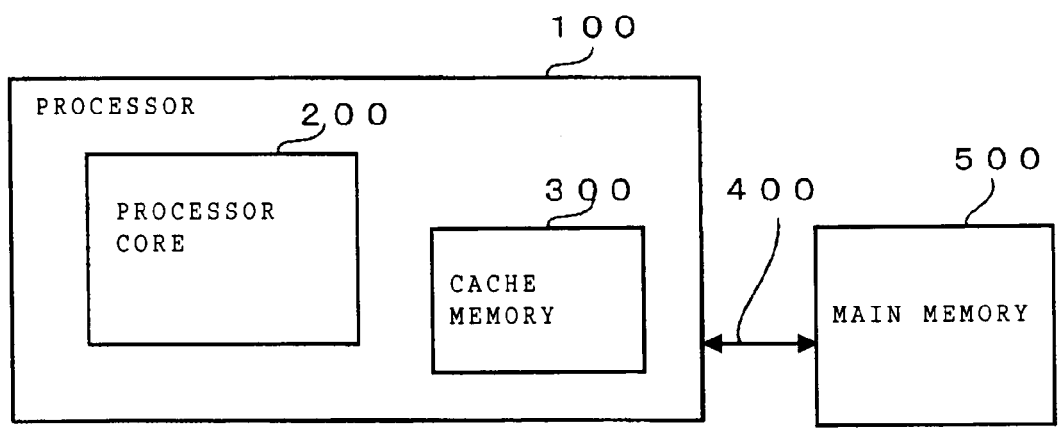
FIG. 2 is a block diagram showing a configuration of a processor system subject to debugging in the computer.

A processor system subject to debugging by the debugging system will be described with reference to FIG. 2. As shown in FIG. 2, a processor system 2a subject to debugging is equipped with a processor 100 constituting the CPU 2 shown in FIG. 1 and a main memory 500 constituting the memory unit 3 shown in FIG. 1. The processor 100 is connected to the main memory 500 via a memory bus 400 constituting the bus 7 of FIG. 1.

The processor 100 is equipped with a cache memory 300 and a processor core 200 to execute a program. The processor core 200 is connected to the main memory 500 via the memory bus 400. The main memory 500 stores data and programs to be read and executed by the processor core 200.

The cache memory 300 is provided with memories. Each of the memories has a smaller capacity and is accessible at higher speed than each of memories configuring the main memory 500.

The cache memory 300 stores a program or data held in the processor core 200 temporarily to increase the speed of access to the program or data by the processor core 200, when the processor core 200 accesses one of the programs or data stored in the main memory 500. The processor 100 may be equipped with an external interface circuit (not shown) such as an 10 port or a bus interface.

The cache memory 300 has a configuration which will be described later with reference to FIGS. 4 and 5. Such a cache memory is described in "Computer architecture, 2nd edition"

by Shinji Tomita (issued on Apr. 30, 2002 by Maruzen Co., Ltd), pp. 170 to 173, for example.

The cache memory 300 is provided between the processor core 200 and the main memory 500 to implement a high-speed operation of the processor core 200. Further, the cache memory 300 has a memory configuration and a read/write control circuit which are different from those of the main memory 500. A read operation from the cache memory 300 relating to the embodiment will be described later in detail.

Figure 3:
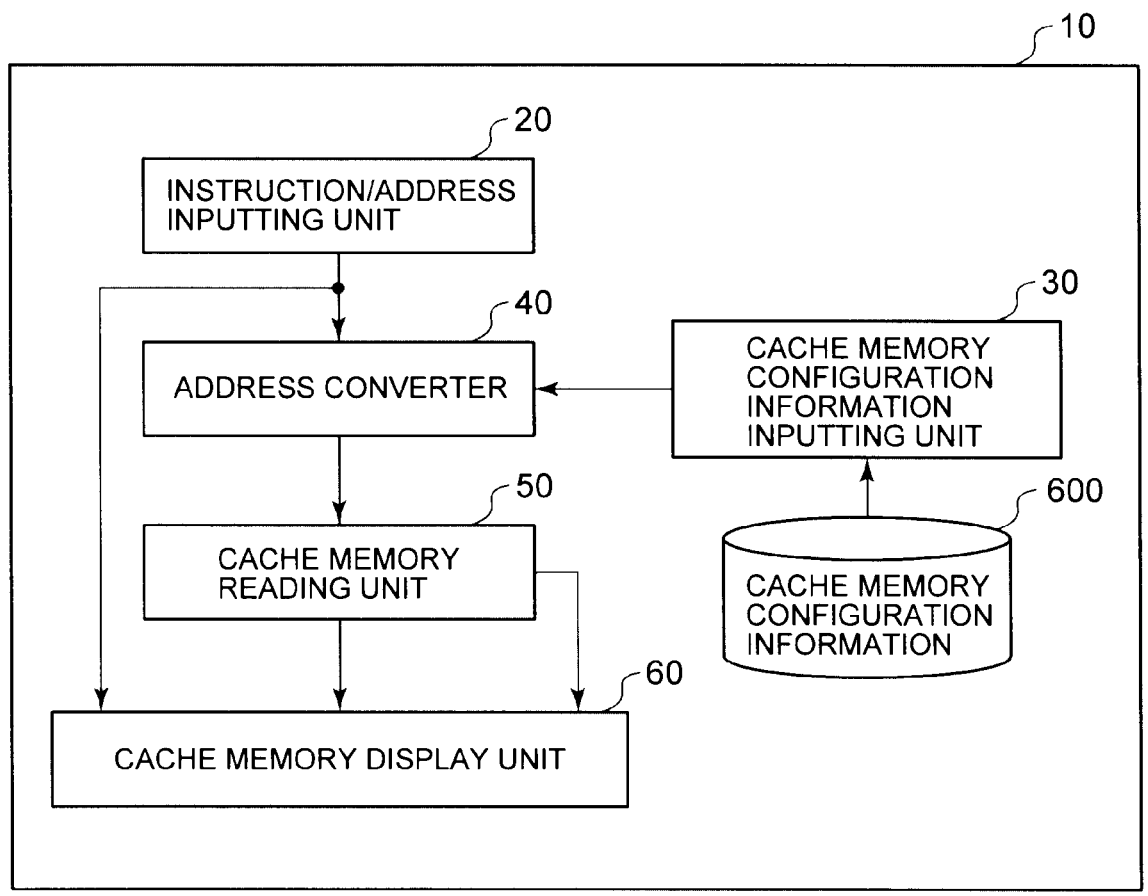
FIG. 3 is a block diagram showing a first embodiment of a debugging system according to the invention.

FIG. 3 is a block diagram showing a first embodiment of the debugging system according to the invention.

A debugging system 10 shown in FIG. 3 is implemented by a debugging program being installed in and executed by the computer 1 of FIG. 1.

The debugging system 10 is equipped with an instruction/address inputting unit 20, cache memory configuration information inputting unit 30, an address converter 40, a cache memory reading unit 50, and a cache memory display unit 60. The cache memory configuration information inputting unit 30 receives cache memory configuration information 600 included in a database. The instruction/address inputting unit 20 may be divided into an instruction inputting unit and an address inputting unit. The functions of the units will be described later in detail.

In FIG. 3, the instruction/address inputting unit 20 as an inputting unit receives a memory address of the main memory 500 of the processor system 2a subject to debugging and an instruction for an operation for debugging. The received memory address is address information to designate an address of data to be read. The address information is referred to as "designation address information" hereinafter.

The cache memory configuration information inputting unit 30 receives memory configuration information of the cache memory 300 of the processor system 2a subject to debugging. The address converter 40 converts the memory address information to cache memory access address information by using the cache memory configuration information 600.

The cache memory reading unit 50 accesses the cache memory 300 with the cache memory access address information obtained by the conversion. If data exists in the cache memory 300, the cache memory reading unit 50 reads the data. The cache memory display unit 60 displays the memory address, the read data, if the data exists, and information on presence or absence of data at the time of access to the cache memory 300 with the converted cache memory access address information.

Figure 4:
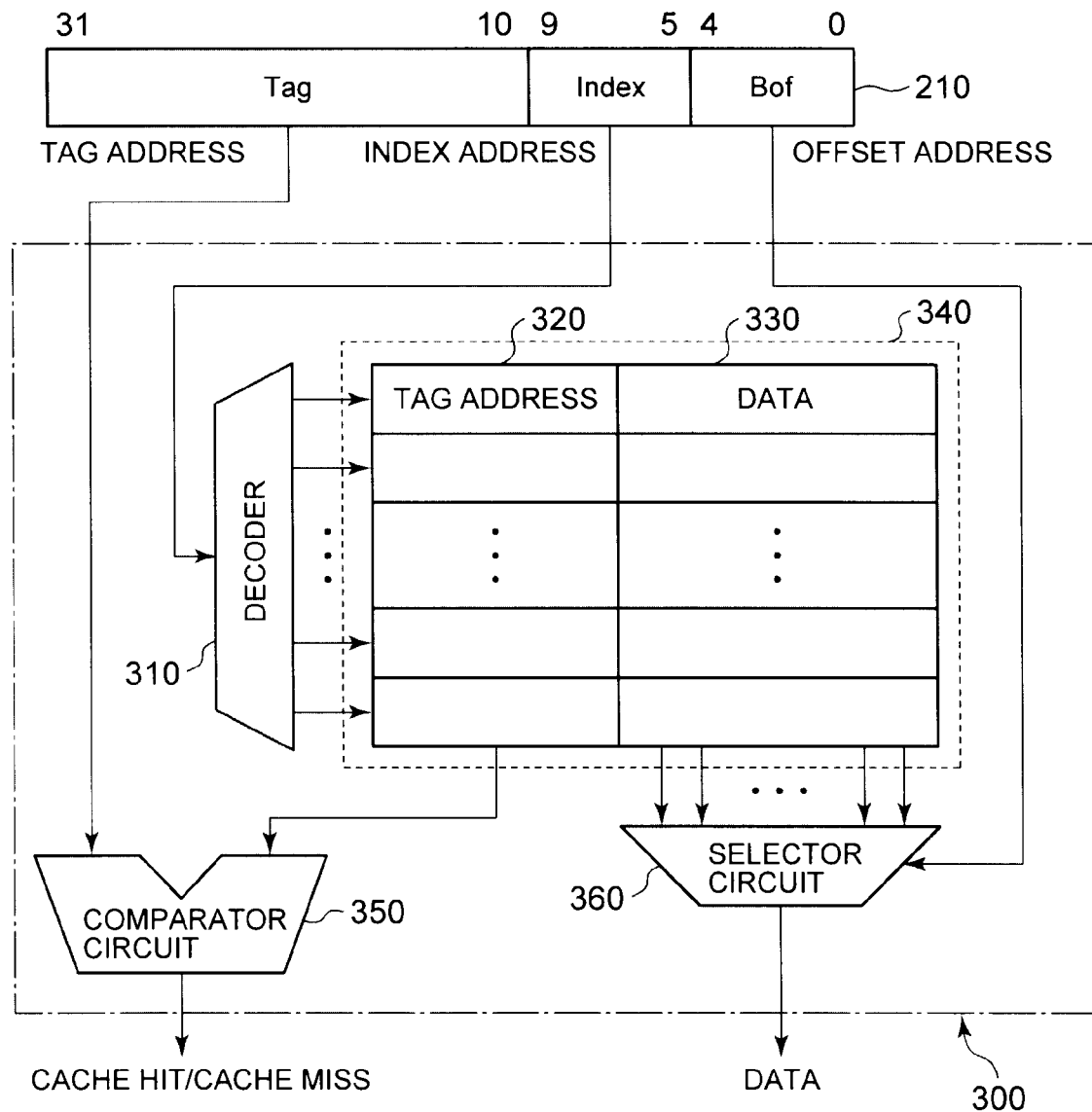
FIG. 4 is a block diagram showing a circuit to perform a read operation of a cache memory configuring the processor.

FIG. 4 is a block diagram showing a configuration of circuits relating to the reading operation of the cache memory 300 shown in FIG. 2. In FIG. 4, the memory size of the cache memory 300 is one kilobyte. The line size of the cache memory 300 is 32 bytes. The cache memory 300 is direct mapped with an associativity of 1. The processor core 200 of FIG. 2 outputs a memory address 210 as address information to read from the cache memory 300.

The memory address 210 includes a 22-bit tag address Tag, a 5-bit index address Index, and a 5-bit offset address Bof. When data corresponding to the outputted memory address is stored in the cache memory 300 (hereinafter expressed as a "cache hit"), the data corresponding to the memory address is outputted to the processor core 200.

As shown in FIG. 4, the cache memory 300 is equipped with a decoder 310, a memory cell unit 340, a tag address comparator circuit 350 and a selector circuit 360 which functions as a reading unit.

The memory cell unit 340 is equipped with a tag address unit 320 and a data unit 330. The decoder 310 receives the index address Index. The tag address unit 320 stores the tag address Tag. The data unit 330 stores data. The tag address comparator circuit 350 is comparator unit which determines whether data corresponding to the tag address Tag to be read is stored and therefore a cache hit occurs, or not stored in the cache memory 300 (hereinafter expressed as a "cache miss"). The selector circuit 360 receives the offset address Bof. When an access to the cache memory results in a cache hit, the selector circuit 360 selectively outputs the data corresponding to the memory address 210 from the data unit 330. The selector circuit 360 is the reading unit of data.

Figure 5:
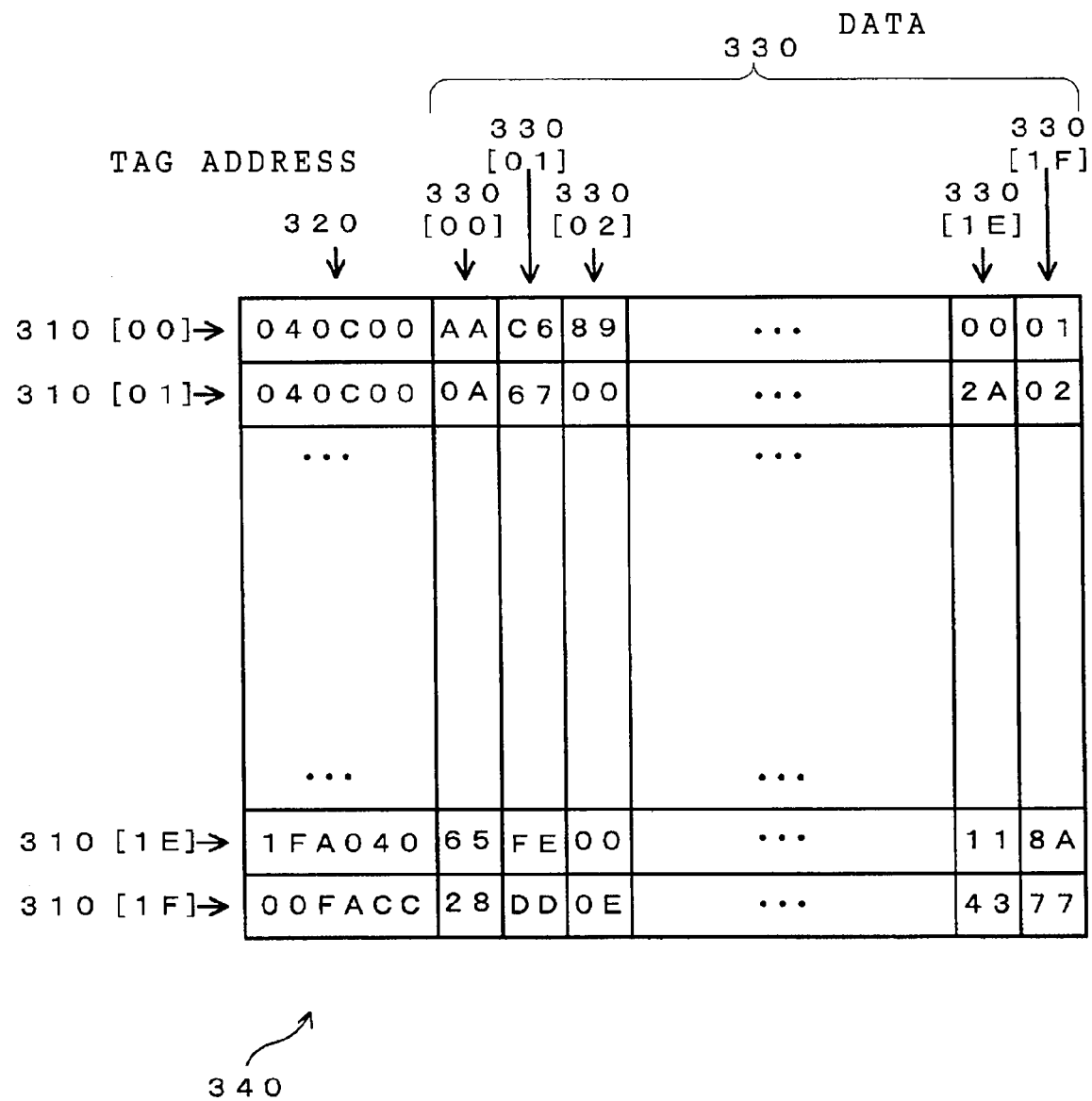
FIG. 5 is a view showing a part of data written in a memory cell unit of the cache memory constituting the processor.

FIG. 5 is a view showing a state of data stored in the memory cell unit 340 when the data is stored in the cache memory 300 at the time of access to the cache memory 300 by the processor core 200 of FIG. 2. Data stored in the main memory 500 of FIG. 2 is read on the basis of the memory address where the data is stored, and is stored in the cache memory 300.

For example, assume that data in a memory address "0x03EB33E0" (hereinafter, "0x" indicates a hexadecimal notation) is to be read from the main memory 500.

The hexadecimal memory address "0x03EB33E0" is converted into a binary number. 22 bits from the 31st bit to the 10th bit of the binary memory address obtained by the conversion are expressed in the hexadecimal notation, and thereby a tag address (Tag) "0x00FACC" is obtained. 5 bits from the 9th bit to the 5th bit of the binary memory address are expressed in the hexadecimal notation, and thereby an index address (Index) "0x1F" is obtained. 5 bits from the 4th bit to the 0th bit of the binary memory address are expressed in the hexadecimal notation, and thereby an offset address (Bof) "0x00" is obtained.

The index address "0x1F" is supplied to the decoder 310 of FIG. 4. As shown in FIG. 5, the tag address "0x00FACC" is stored in a region of the tag address unit 320 in the memory cell unit 340, the region designated by the decoder 310. A piece of data "0x28" is stored in a portion designated by the offset address (Bof) "0x00" in a region of the data unit 330 of the memory cell unit 340 designated by the decoder 310.

An example of the reading operation from the cache memory 300 will be described below. The operation example is of a case where the processor core 200 of FIG. 2 executes a 1-byte data read instruction LB (Load Byte) to read data from the main memory 500.

The processor core 200 of FIG. 2 fetches and decodes a data read instruction, and calculates and outputs the 32-bit memory address 210 (shown in FIG. 4) to be accessed by a scheme set by the data read instruction. Cache memory access address information is generated based on the memory address 210.

The reading operation from the cache memory 300 is started by using the outputted memory address 210. When the memory address 210 is outputted from the processor core 200, the cache memory 300 built in the processor 100 is first accessed.

For example, assume that the memory address "0x03EB33E0" is to be accessed. The hexadecimal memory address "0x03EB33E0" is converted into a binary number. 22 bits from the 31st bit to the 10th bit of the binary memory address obtained by the conversion are expressed in the hexadecimal notation, and thereby a tag address (Tag) "0x00FACC" is obtained. 5 bits from the 9th bit to the 5th bit of the binary memory address are expressed in the hexadecimal notation, and thereby an index address (Index) "0x1F" is obtained. 5 bits from the 4th bit to the 0th bit of the binary memory address are expressed in the hexadecimal notation, and thereby an offset address (Bof) "0x00" is obtained.

The obtained index address "0x1F" is inputted to the decoder 310 of the cache memory 300.

An output line of the decoder 310 corresponding to [0x1F] is made active by the input of the index address "0x1F." As a result, "0x00FACC" is read from the tag address unit 320 of the memory cell unit 340 and inputted to one input end of the tag address comparator circuit 350. As a tag address included in the memory address 210, "0x00FACC" is inputted to the other input end of the tag address comparator circuit 350.

In the above operation example, the two tag addresses inputted to the tag address comparator circuit 350 match. Therefore, a cache hit signal ("High", for example), which shows that data exists in the address accessed in the memory cell unit 340, is outputted from the cache memory 300.

The selector circuit 360 receives "0x00" as the offset address Bof included in the memory address 210 and the output line of the decoder 310 corresponding to [0x1F] is active. The content that is read from the data unit 330 in accordance with Bof [0x00] is "0x28". The content "0x28" is outputted to the processor core 200 as 1-byte length data.

However, a cache miss signal ("Low", for example) showing that data corresponding to the appropriate memory address does not exist in the cache memory 300 is outputted from the cache memory 300, when values of the two tag addresses inputted to the tag address comparator circuit 350 are different. The output of the cache miss signal causes the processor core 200 of FIG. 2 to read data from the main memory 500. The speed of reading the data from the main memory 500 is slower than the speed of reading from the cache memory 300, since the read processing speed is slow and the signal transmission speed of the memory bus 400 is slow.

Further, when the cache miss signal occurs due to the access to the cache memory 300, the cache miss signal may be used as an interrupt signal. For example, processing of reading data corresponding to consecutive addresses in the main memory 500 from the main memory 500 and storing the data in the cache memory 300 is performed in advance. The processing enables the stored data to be read from the cache memory 300 with the miss signal as the interrupt signal. As a result, a hit rate of the cache memory 300 can be improved. The hit rate of the cache memory is a number of times of reading from the cache memory 300 divided by a number of times of reading from all memories. By improving the hit rate of the cache memory 300 in this manner, the system performance of the debugging system 10 can be improved.

A debugging process of a computer program executed on the processor 100 shown in FIG. 2 will be described.

A computer program, which implements a desired function to be executed by using the processor 100, can be developed by using the computer 1 of FIG. 1. In the computer 1, a group of various application programs included in a program development environment such as an editor, a compiler, a linker, and a simulator is prepared. In the development of a computer program, a source program (file) written in C language or assembler language is first created by using the editor. Subsequently, the source program (file) is compiled with the compiler, and consequently an object program (file) to be executed on the processor 100 is created. The linker links object programs as needed, and an executable object program (file) is finally created.

Then, the object program (file) is read and loaded onto the simulator that simulates an operation of the processor 100. The simulator performs a simulation operation of the execution of the object program on the processor 100. The object program is verified with the simulation operation. If a failure in the program is found in the verification process, a debugging process is performed.

The debugging system 10 of the embodiment stops the simulation operation of the simulator at a time point when it is determined that a failure has occurred due to the operation of the program executed on the processor 100 being different from that desired. The simulation operation of the simulator is stopped by a breakpoint or an instruction inputted to and set up in the debugging system 10.

At the point of the stop of the simulator, a debugging operator uses the debugging system 10 to access a status storage unit (not shown) provided to the processor system 2a so that various pieces of information are displayed. The debugging operator rewrites the program as needed. The debugging operator designates a time point of restarting the execution of the program, causes the simulation operation of the simulator to be restarted, and continues the debugging process.

The various pieces of information include data stored in registers of the processor 100, the cache memory 300 and the main memory 500, and a program code in execution.

Processing steps to cause the debugging system 10 shown in FIGS. 1 to 4 to display the content of the cache memory 300 will be described below.

Figure 6:
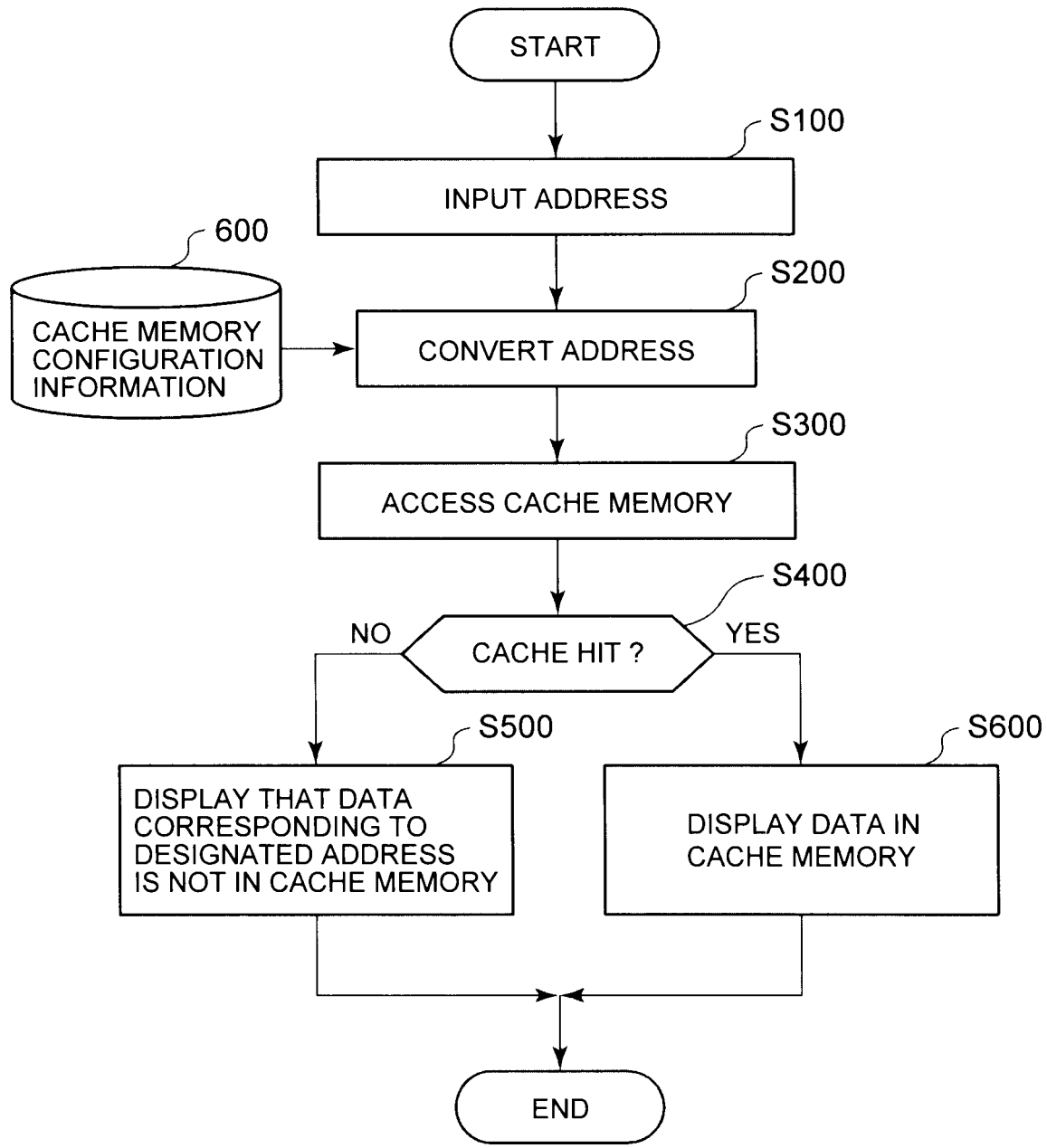
FIG. 6 is a flowchart showing instruction processing steps of the debugging system according to the first embodiment.

FIG. 6 is a flowchart showing instruction processing steps of the debugging system 10. FIG. 6 shows the instruction processing steps of a case where the debugging system 10 receives an instruction to display the content of the cache memory 300 and the memory address of the main memory 500 as the designation address information.

Figure 7:
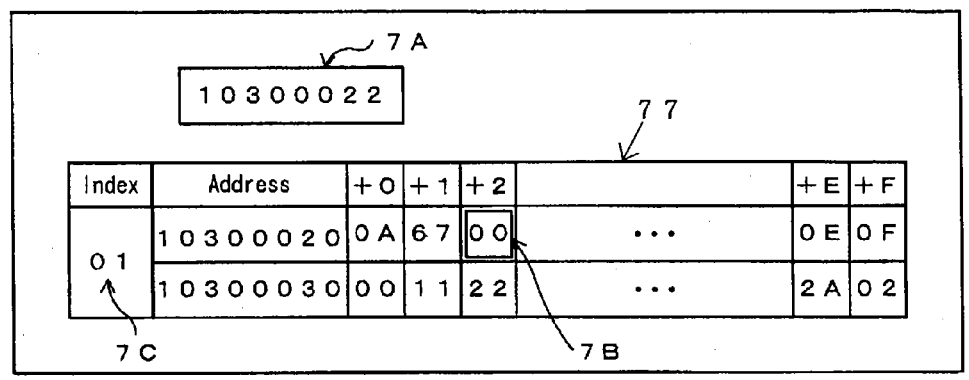
FIG. 7 is a view showing a display example of an instruction execution result by the debugging system according to the first embodiment.
Figure 8:
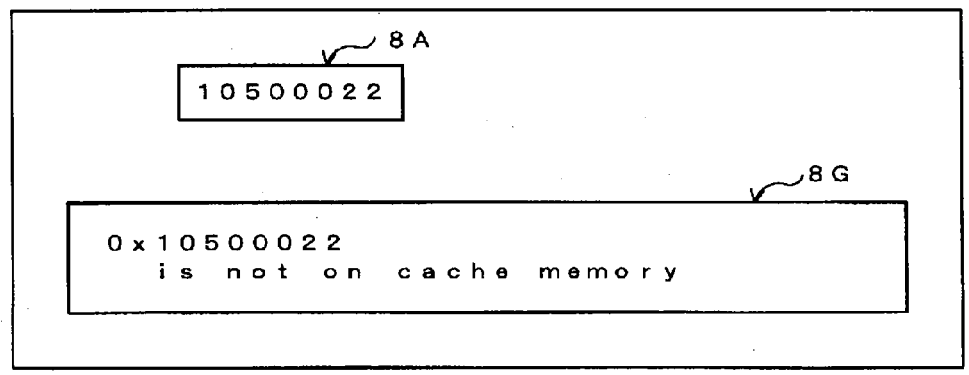
FIG. 8 is a view showing another display example of the instruction execution result by the debugging system according to the first embodiment.

FIGS. 7 and 8 are display examples of the execution result of the instruction. FIG. 7 shows a case where a piece of data corresponding to the inputted memory address is stored in the cache memory 300 and therefore a cache hit occurs. FIG. 8 shows a case where a piece of data corresponding to the inputted memory address is not stored in the cache memory 300 and therefore a cache miss occurs.

In FIG. 6, a read instruction for the cache memory 300 and the memory address of the main memory 500 are inputted by the instruction/address inputting unit 20 of the debugging system 10 which is shown in FIG. 3 (step S100). The memory address is used as the designation address information to display the data stored in the cache memory 300.

The cache memory configuration information 600 included in the database is read through an input operation of the cache memory configuration information inputting unit 30 in FIG. 3. As a result, the main memory address, which is inputted in accordance with the cache memory configuration information, is converted to cache memory access information by the address converter 40 (step S200). The cache memory access information is composed of a tag address, an index address, and an offset address.

The configuration information of the cache memory 300 read from the database is used for the conversion by the address converter 40. The cache memory configuration information is configuration information such as a memory size of 1 kilobyte, a line size of 32 bytes, and an associativity of 1. In the description below, [N:M] indicates a bit range from the Nth bit to the Mth bit. Herein, N and M are positive integers.

An address conversion is performed as follows based on the configuration information described above. Bits from the 31st bit to 10th bit of a 32-bit main memory address [31:0] are converted to a 22-bit tag address. 5 bits from the 9th bit to the 5th bit of the main memory address [31:0] are converted to an index address. 5 bits from the 4th bit to the 0th bit of the main memory address [31:0] are converted to an offset address.

For example, assume that a 32-bit main memory address "0x10300022" (hexadecimal notation), which is an address displayed in a display region 7A of the cache memory display unit 60 of FIG. 7, is inputted to the address converter 40 of FIG. 3. The hexadecimal memory address "0x10300022" is converted into a binary number. 22 bits from the 31st bit to 10th bit of the binary memory address obtained by the conversion are expressed in the hexadecimal notation, and thereby a tag address "0x040C00" (hexadecimal notation) is obtained.

Five bits from the 9th bit to the 5th bit of the binary memory address becomes an index address "00001" (binary notation). Five bits from the 4th bit to the 0th bit of the binary memory address becomes an offset address "00010" (binary notation).

The tag address "0x040C001" (hexadecimal notation), the index address "00001" (binary notation), and the offset address "00010" (binary notation) are the cache memory access information.

Then, the cache memory reading unit 50 of FIG. 3 performs an access operation of reading data from the cache memory 300 by using the obtained cache memory access information (step S300).

When the index address "00001" is inputted to the cache memory 300, the cache memory reading unit 50 of FIG. 3 reads data stored in a region of the memory cell unit 340 designated by an output 310 of [0x01] from the decoder 310.

For example, in the case of the memory cell unit 340 storing data shown in FIG. 5, an output line of the decoder 310 corresponding to [0x01] becomes active. As a result, "0x040C00" in the second line of the tag address unit 320 and one-line data (32 bytes) consisting of "0x0A," "0x67," "0x00," . . . , "0x2A," and "0x02" in the second line of the data unit 330 designated for the reading are read.

The cache memory reading unit 50 of FIG. 3 compares values of two tag addresses inputted to the tag address comparator circuit 350 of the cache memory 300 of FIG. 4 and checks whether the access to the cache memory 300 results in a cache hit from the comparison result (step S400).

If the two tag addresses do not match and therefore the access to the cache memory 300 results in a cache miss, the processing proceeds to step S500. When the two tag addresses match and therefore the cache memory access results in a cache hit, the processing proceeds to step S600.

The debugging system 10 causes the tag address comparator circuit 350 to compare information of the tag address Tag (main memory address [31:10]) converted from the memory address 210 of FIG. 4 and tag address information outputted from the tag address unit 320 selected by the active output line of the decoder 310 corresponding to [01]. Based on the comparison result, whether or not a cache hit occurs is determined. When the values of the two tag addresses differ, it is determined as a cache miss since the data corresponding to the memory address 210 is not stored in the cache memory 300. When the values of the two tag addresses match, it is determined as a cache hit since the data corresponding to the memory address 210 is stored in the cache memory 300.

When there is no cache hit, the debugging system 10 causes the cache memory display unit 60 of FIG. 6 to display that the data corresponding to the main memory address 210 designated by the instruction is not on the cache memory 300, as shown in FIG. 8 (step S500). After executing the display, processing of the instruction to read and display the content of the cache memory 300 is terminated.

In the display example of FIG. 8, a designated main memory address "0x10500022" is displayed in a display region 8A. In a display region 8G, it is displayed that data corresponding to the main memory address "0x10500022" does not exist in the cache memory 300.

In the memory cell unit 340 of the cache memory 300 shown in FIG. 4, data having the content shown in FIG. 5 is stored. When "0x10500022" is inputted as the main memory address, the index address Index becomes "00001." The output line corresponding to the output 310 of [0x01] of the decoder 310 is made active by the index address Index.

As a result, the tag address Tag read from the second line of the designated tag address unit 320 becomes "0x040C00." By contrast, the tag address converted from the main memory address is "0x040C00," and therefore the values of the two tag addresses do not match in the tag address comparator circuit 350. Thus, it is determined that data corresponding to the designated main memory address is not stored in the cache memory 300, and the determination result is displayed as a message in the display region 8G of the cache memory display unit 60 of FIG. 8. The content of the message displayed in the display region 8G is an example. Other expressions may be used as long as the content shows that the access to the memory results in a cache miss.

When there is a cache hit, the debugging system 10 causes the cache memory display unit 600 to display the piece of data corresponding to the main memory address stored in the cache memory 300 together with the memory address 210 designated by the instruction (step S600 of FIG. 6). After executing the display, processing of the instruction to display the content of the cache memory 300 is terminated.

On the other hand, when the data corresponding to the designated memory address exists in the cache memory 300, the memory address "0x10300022" is displayed in the display region 7A of FIG. 7, and data corresponding to the address, i.e., one-line data of the cache memory 300 are collectively and simultaneously displayed using two lines in a display region 77. In the display region 77, "+0" to "+F" indicate values of the smallest digits of the main memory address.

A piece of data, which is designated by the offset address "00010," i.e., data "0x000" displayed in a display region 7B of FIG. 7, is highlighted.

When data is stored in the memory cell unit 340 of the cache memory 300 as shown in FIG. 5 and when the memory address "0x10300022" is inputted to the debugging system 10 of FIG. 3, the index address Index obtained by conversion is "0x01", as shown in a display region 7C of FIG. 7. The output line corresponding to the output 310 of [0x01] of the decoder shown in FIG. 5 becomes active. The tag address Tag, which is read from designated the tag address unit 320, in the second line of the memory cell unit 340 of the cache memory 300 is "0x040C00."

The tag address Tag converted from the memory address is also "0x040C00," and therefore two tag address values match in the tag address comparator circuit 350 of FIG. 4. Thus, it is determined that the designated memory address "0x10300022" is stored in the cache memory 300.

As a result, the output line (the second line) corresponding to the output 310 [0x01] of the decoder shown in FIG. 5 becomes active and is designated. The piece of data "0x00", which is saved in the portion (column) 330[0x02] in the data unit 330, is designated by the offset address "00010" and is read from among the designated one-line data (32 bytes) being the second line data of the memory cell unit 340, by the status storage unit of the processor of the simulator.

The display content shown in FIG. 7 is an example, and other expressions may be used as long as the content shows that the access to the memory results in a cache hit and the piece of data is "0x00."

According to the first embodiment described above, a piece of data stored in the memory cell unit 340 of the cache memory 300 can be displayed by designating the memory address of the main memory. Thus, the debugging process of the computer program in consideration of the data stored in the cache memory can be performed in a similar manner to a debugging process of an object program loaded on the main memory. In the embodiment, when the content of the cache memory is checked, the operator does not need to perform complex conversion from the cache memory configuration information to the tag address, the index address or the like, and comparison of addresses. Thus, the efficiency of the debugging process is improved.

Figure 9:
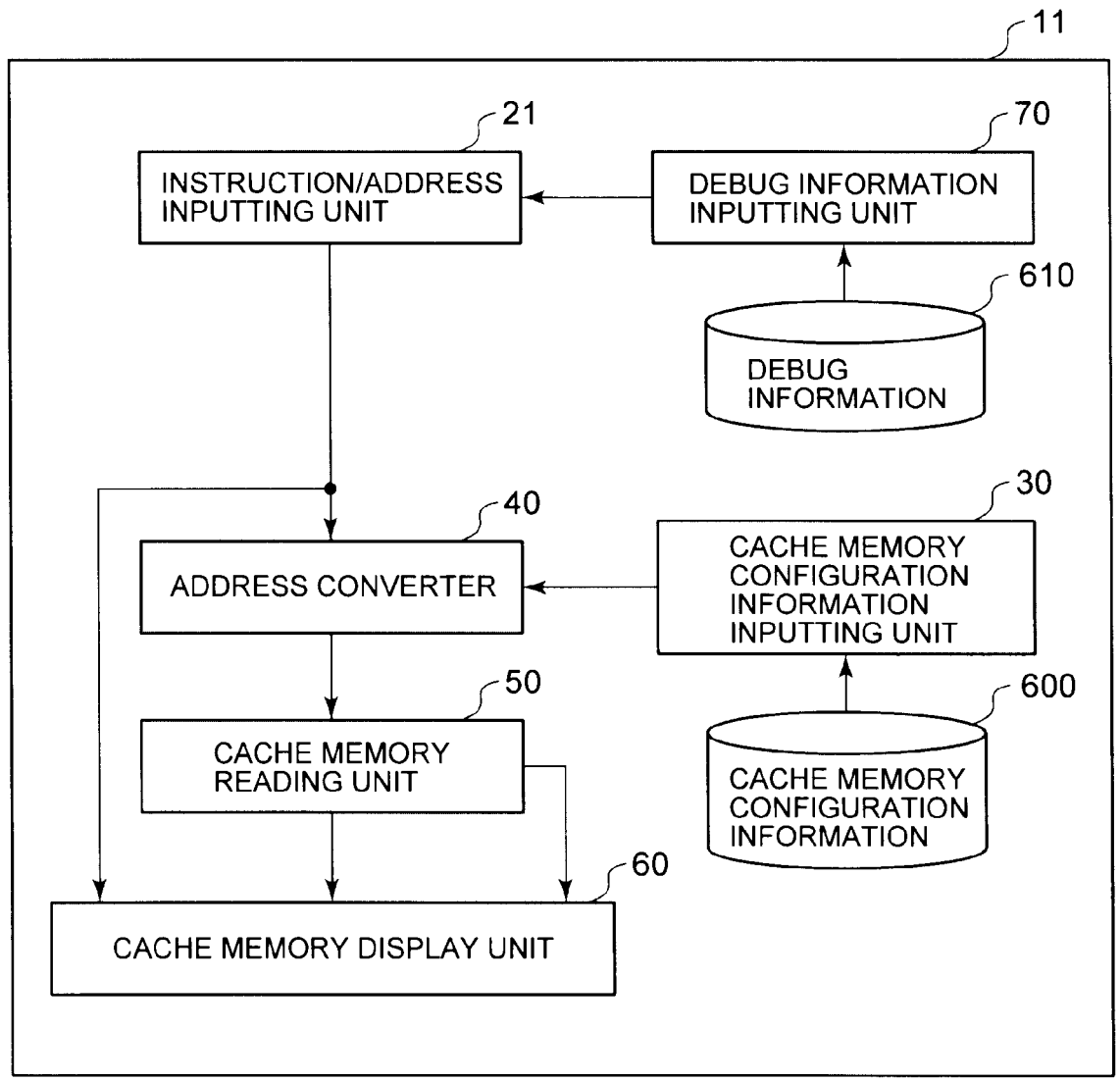
FIG. 9 is a block diagram showing a second embodiment of the debugging system according to the invention.
Figure 10:
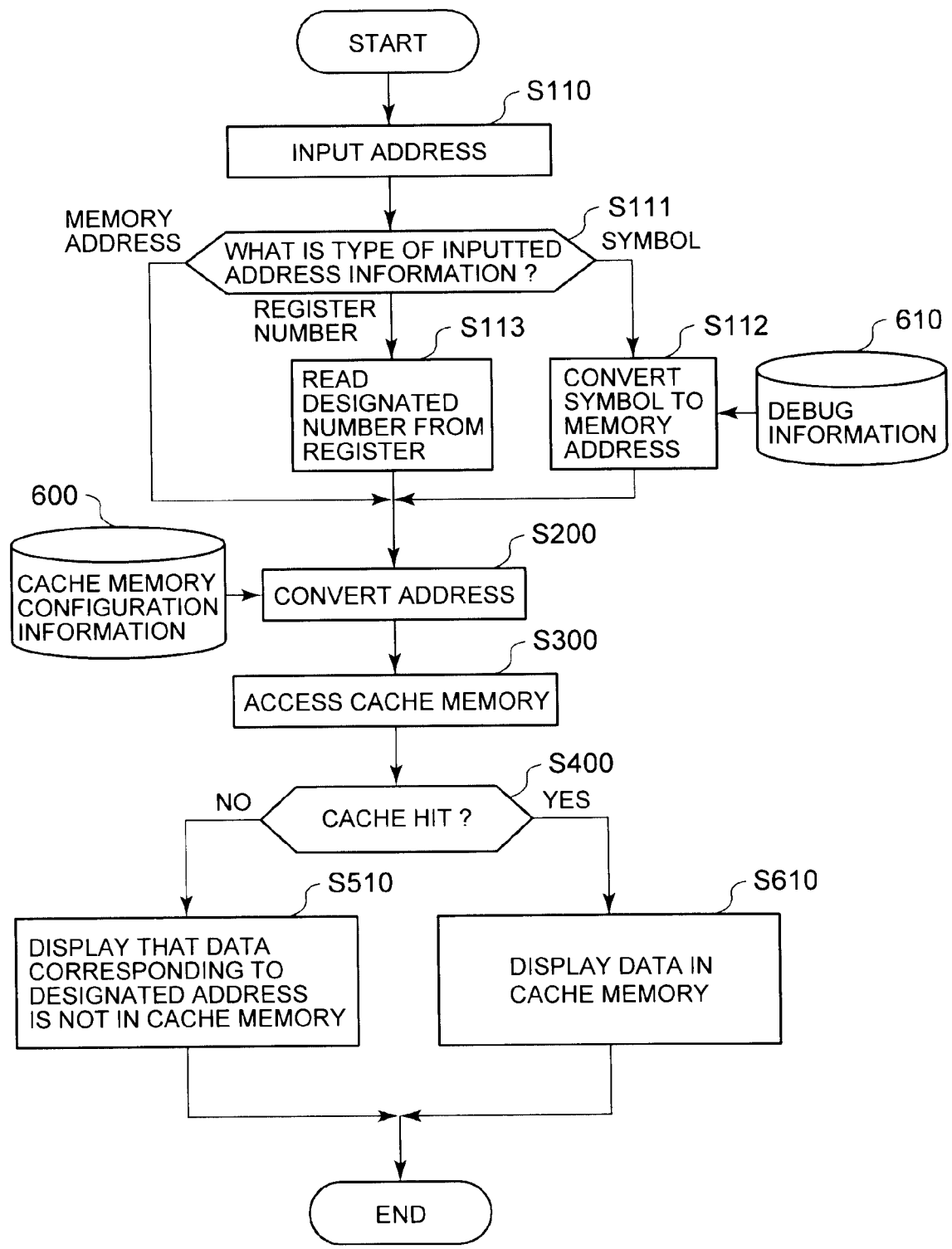
FIG. 10 is a flowchart showing instruction processing steps of the debugging system according to the second embodiment.
Figure 11:
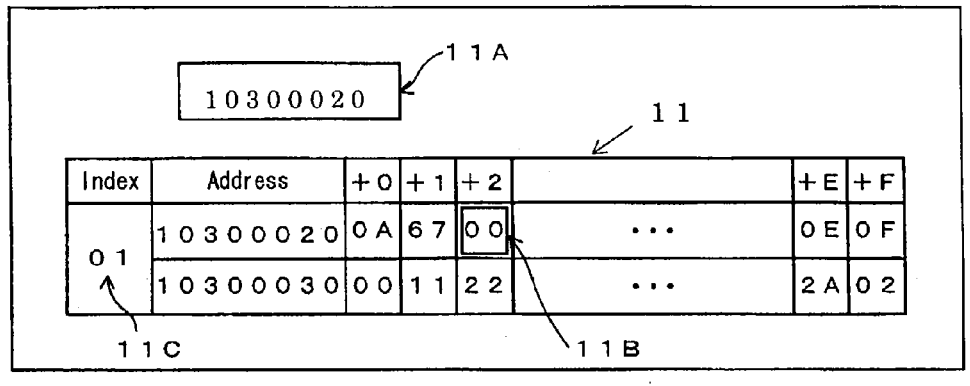
FIG. 11 is a view showing a display example of an instruction execution result by the debugging system according to the second embodiment.
Figure 12:
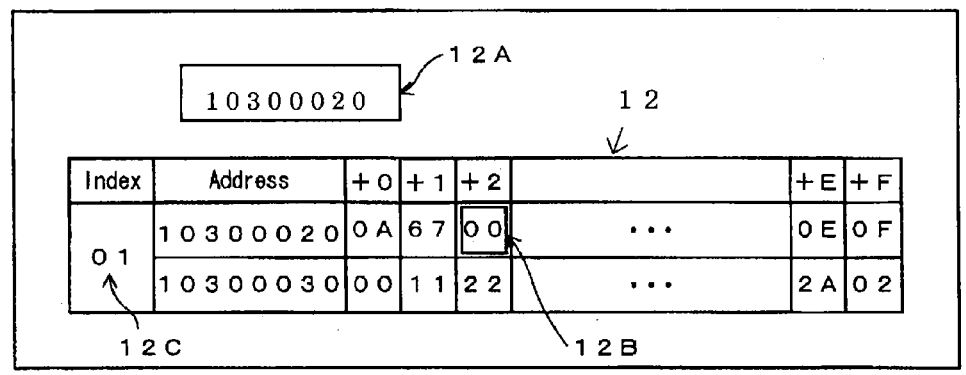
FIG. 12 is a view showing another display example of the instruction execution result by the debugging system according to the second embodiment.

A debugging system according to a second embodiment of the invention will be described with reference to FIGS. 9 to 12. FIG. 9 is a block diagram showing a configuration of the debugging system according to the second embodiment. FIG. 10 is a flowchart showing instruction processing steps of the debugging system in the second embodiment. FIGS. 11 and 12 are display examples of an instruction execution result. In the second embodiment described below, FIGS. 1, 2, 4, and 5 described above are also referenced as well as FIGS. 9 to 12.

A computer used in the embodiment has a similar configuration to the computer 1 of FIG. 1. A processor having a built-in cache memory subject to debugging has the same configuration as the processor 100 shown in FIG. 2. It is assumed that data stored in the cache memory built in the processor of the embodiment is the same as the data stored in the cache memory 300 shown in FIGS. 4 and 5.

In the instruction processing to display the content of the cache memory, the debugging system of the embodiment can designate an address to access the cache memory by using not only a memory address of a main memory represented by a numerical value but also a register number of a register in the processor or a symbol used in the description of a source program.

As shown in FIG. 9, a debugging system 11 is implemented by a debugging program being installed in and executed by the computer 1 of FIG. 1. The debugging system 11 is equipped with a debug information inputting unit 70, an instruction/address inputting unit 21, the cache memory configuration information inputting unit 30, the address converter 40, the cache memory reading unit 50, and the cache memory display unit 60.

The debug information inputting unit 70 inputs debug information of a database is inputted to the instruction/address inputting unit 21. The debug information 610 includes information showing the correspondence between the symbol and the memory address. The instruction/address inputting unit 21 receives designation address information and an instruction for an operation for debugging. If a symbol is inputted as the designation address information, the instruction/address inputting unit 21 converts the symbol to address information represented by a numerical value by using the debug information. If a register number of a register in the processor 100 is inputted, address information represented by a numerical value stored in a register of the register number is read.

The cache memory configuration information inputting unit 30 receives the cache memory configuration information 600 in the database. The address converter 40 converts the address information represented by a numerical value obtained from the instruction/address inputting unit 21 to cache memory access address information by using the cache memory configuration information 600.

The cache memory reading unit 50 accesses to the cache memory 300 on the basis of the obtained cache memory access address information and, if data exists, reads the stored data. The cache memory display unit 60 displays information on presence or absence of data at the time of the access to the cache memory 300, and, when the data exists, displays the read data.

The debug information is created in the following manner. In a program developing process, a debug option is designated at the time of compiling a source program (file) with a compiler to create an object program (file). Upon the designation, the debug information is created as information (file) to support the debugging process.

As the debug information, there is information, for example, showing the correspondence between a symbol used in the description of the source program and main memory address information. When the address information corresponding to the symbol is relative access information, the debug information used in the description below is converted to the memory address information represented by a numerical value by the /address inputting unit 21 by using link information or the like at the time of creating a final execution program with a linker.

The processing steps of a case where the content of the cache memory 300 is displayed by the debugging system 11 of the second embodiment described above will be described.

The instruction processing steps of the debugging system 11 will be described below with reference to FIG. 10.

The instruction/address inputting unit 21 of the debugging system 11 inputs a read instruction for reading from the cache memory 300 of FIG. 4 and the designation address information designated for data display (step S110).

Subsequently, the type of the inputted designation address information is checked (step S111). If the designation address information is a main memory address, the processing proceeds to step S200. If the designation address information is a register number, the processing proceeds to step S113. If the designation address information is a symbol, the processing proceeds to step S112.

The determination of the type of the designation address information is performed by a comparison of a character string inputted in step S110 in accordance with a predetermined sequence.

If the inputted character string has a binary or hexadecimal numerical value following a predetermined identifier, the character string is determined as a main memory address. In the embodiment, the binary numerical value is surrounded by quotation marks in which the identifier can be omitted, and the hexadecimal numerical value is surrounded by quotation marks with the identifier being "0x."

If the inputted character string follows "$r," the character string is determined as a register number. If the inputted character string follows any other identifier, the character string is determined as a symbol.

If the specification of the debugging system 11 defines an identifier represented by an octal or decimal numerical value or a numeric representation that enables omission of the identifier, a comparison of the character string is performed and the character string following the identifier is subjected to numerical value conversion processing so that it is determined accordingly. If a register of the processor can be designated by means other than a number, "$," for example, is prefixed to the designated character string. If a character string including "$" is inputted, processing is performed such that the designated character string becomes the designation address information.

If the designation address information is the register number, address information represented by a numerical value stored in the register of the designated number is read from a register information storage unit built in the processor on the simulator, and the processing proceeds to step S200 (step S113).

In this case, the debugging system 11 reads the address information represented by a numerical value stored in the register of the designated register number in the processor 100 of FIG. 2 by using generally-used steps, for example, of reading information of a processor system status storage unit at the point when the simulator is stopped.

If the designation address information is represented by a symbol, debug information is read from the debug information 610 of the database. Further, the symbol as the designation address information is converted to the main memory address information, and the processing proceeds to step S200 (step S112).

The debug information shows the correspondence between a symbol and main memory address information represented by a numerical value. The debugging system 11 searches the database for the debug information 610 by using a method generally used in software processing, such as a text search, and reads the main memory address corresponding to a symbol that matches the symbol.

Subsequently, an instruction from the cache memory configuration information inputting unit 30 of FIG. 9 causes the cache memory configuration information 600 to be read from the database. In accordance with the cache memory configuration information 600, the main memory address thus read is converted to cache memory access information by the address converter 40 (step S200). The cache memory access information includes a tag address, an index address, and an offset address.

The cache memory reading unit 50 of FIG. 9 performs an access operation for reading with respect to the cache memory 300 of FIGS. 2 and 4 by using index address information obtained by the conversion (step S300).

The cache memory reading unit 50 of FIG. 9 compares values of two tag addresses inputted to the tag address comparator circuit 350 of the cache memory 300 shown in FIG. 4. From the comparison result, the cache memory reading unit 50 checks whether the access to the cache memory results in a "cache hit" (step S400). If the two tag addresses do not match and therefore the cache memory access results in a "cache miss," the processing proceeds to step S510. If the two tag addresses match and therefore the access to the cache memory results in a "cache hit," the processing proceeds to step S610.

If there is no "cache hit," the debugging system 11 proceeds to step S510. In step S510, the cache memory display unit 60 displays that data corresponding to the cache memory address designated by the instruction is not on the cache memory 300. After the displaying has been executed, the processing of the instruction to display the content of the cache memory 300 is terminated.

If there is a "cache hit," the debugging system 11 proceeds to step S610. In step S610, the cache memory display unit 60 displays the main memory address designated by the instruction and the address information designated to display data. Further, data corresponding to the appropriate address stored in the cache memory 300 is displayed. After the displaying has been executed, the processing of the instruction to display the content of the cache memory 300 is terminated.

FIG. 11 shows the display example of the execution result of the instruction. The display is performed on the image display device 5 of FIG. 1. The display example is a case where the designation address information designated by the instruction is a symbol. Further, the display example is a case where a piece of data belonging to the memory address "0x10300022" exists in the cache memory 300. The memory address "0x10300022" is obtained by converting the symbol with the debug information.

In FIG. 11, a display region 11A displays an address "10300022" showing a start address of a program that defines a function func_a. A display region 11 of FIG. 11 displays the data belonging to the memory address "0x10300022" corresponding to the symbol.

In this example, one-line data of the cache memory 300 are displayed simultaneously in two lines. A piece of data "0x00" designated by the offset address is highlighted in a frame 11B. The contents of the display are examples, and other expressions may be used as long as it is shown that the access to the cache memory 300 results in a "cache hit" and the cache hit data is "0x00."

FIG. 12 shows another display example of the execution result of the instruction. The display example is an example of a case where the designation address information designated by the instruction is a register number. Further, the display example is an example of a case where a memory address corresponding to the register number exists in the cache memory 300. In FIG. 12, a display region 12A displays an address "10300022". A display region 12 of FIG. 12 displays data belonging to the memory address corresponding to the register number. In this example, one-line data of the cache memory 300 are displayed simultaneously in two lines. The piece of data "0x00" designated by the offset address is highlighted in a frame 12B. The contents of the display are examples, and other expressions may be used as long as the content shows that the access to the cache memory 300 results in a "cache hit" and the data to be accessed is "0x00."

According to the second embodiment described above, the access to the cache memory or the display of the content of the cache memory can be performed by designating the symbol used in creating the source program or designating the register number, in addition to designating the memory address. Unlike the first embodiment, the second embodiment eliminates the need for converting the memory address to the tag address, the index address, or the like by use of the configuration information of the cache memory to perform the process of comparing addresses when the cache memory is to be accessed. Further, a program analysis can be performed with representations easier for a person performing debugging to understand, and the efficiency of the debugging process is consequently improved.

For example, when a debugging process of a program is performed in consideration of data stored in the cache memory, the data stored in the cache memory can be referenced with a symbol used in creating a source program.

Thus, the debugging process can be performed by using symbol information used in creating the program without checking the memory address or the like by which the object program is loaded. Alternatively, the data stored in the cache memory can be referenced on the basis of the content of the register of the processor at the time point when the processor is stopped for debugging, for example. Since an analysis process can be performed intensively in consideration of the function of the register assigned by the program at the time of the stop, the efficiency of the debugging process is improved.

In the second embodiment described above, the memory address, the symbol, or the register number is used as the representation of the designation address information to display the data inputted to the instruction/address inputting unit 21. An arbitrary variable may be used as the representation of a designation address. In a similar manner to the symbol, the arbitrary variable is converted to the memory address or register number assigned by the variable by using the debug information.

Further, instead of these representations of the designation address information, a mathematical representation may be used in which two or more representations selected from address representations such as a memory address, a symbol (corresponding to the memory address information), a register number, and a constant number are associated by one arithmetic operator or a plurality of arithmetic operators. The arithmetic result of the formula becomes the designation address information to display the data in the cache memory. Since the debugging process can make progress easily in accordance with the description representation of the source program by using these representations of the designation address information, the debugging process efficiency is further improved.

Figure 13:
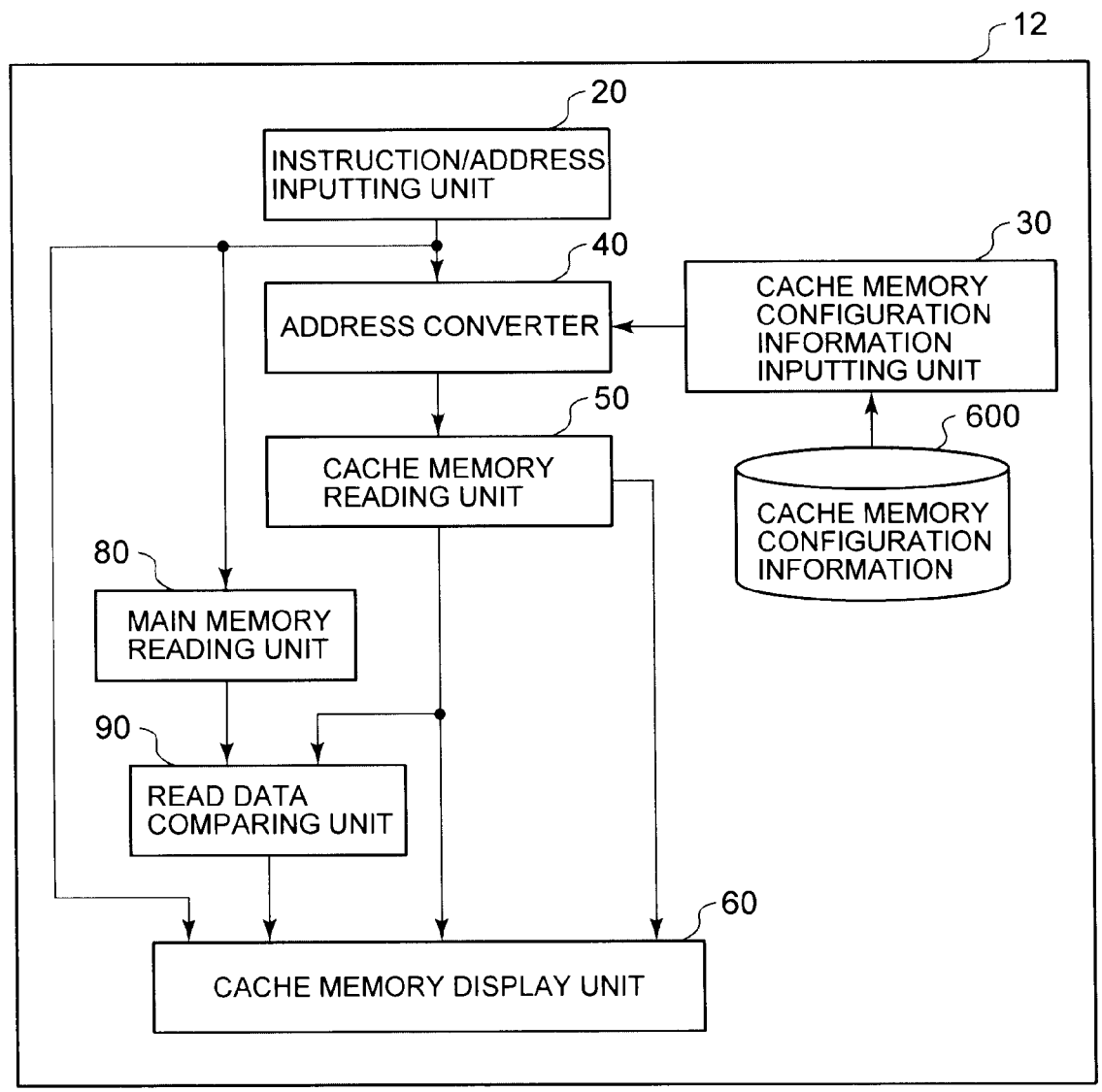
FIG. 13 is a block diagram showing a third embodiment of the debugging system according to the invention.
Figure 14:
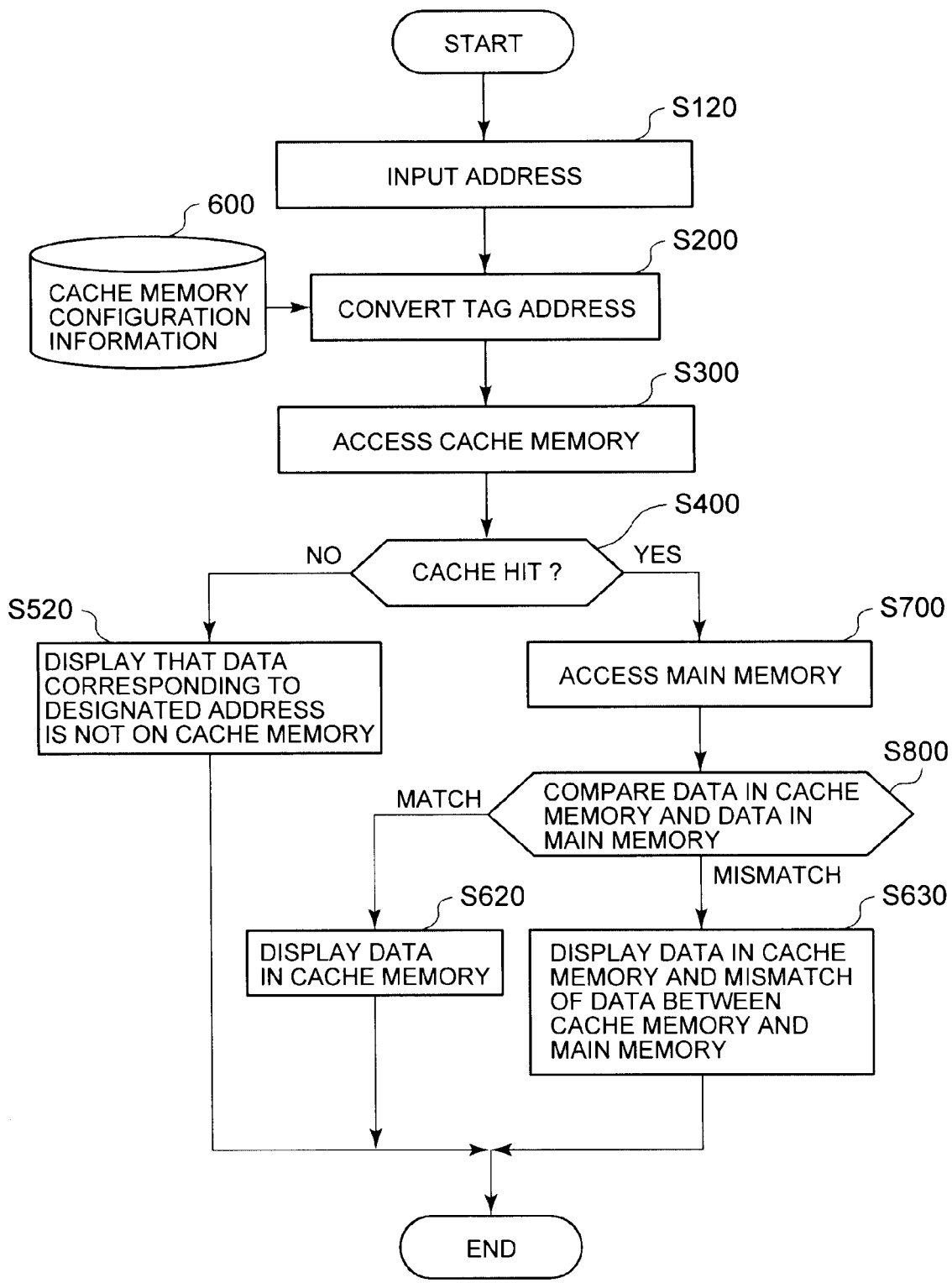
FIG. 14 is a flowchart showing instruction processing steps of the debugging system according to the third embodiment.
Figure 15:
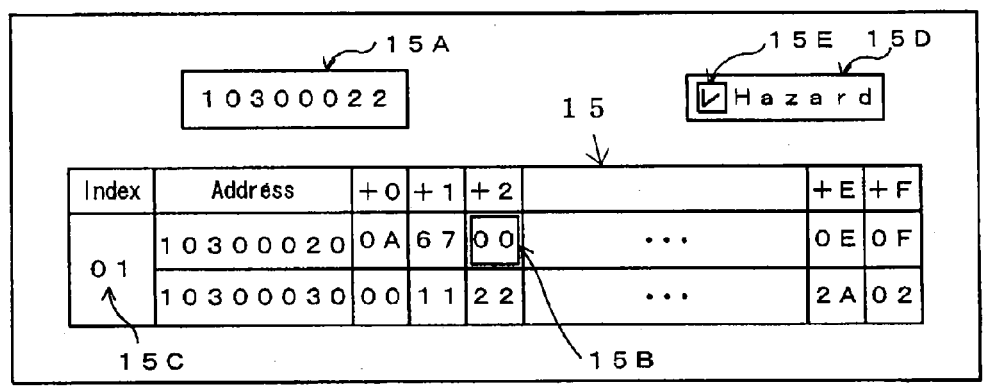
FIG. 15 is a view showing a display example of an instruction execution result by the debugging system according to the third embodiment.

A debugging system according to a third embodiment of the invention will be described with reference to FIGS. 1, 2, 4, 5, and 13 to 15. FIG. 13 is a block diagram showing a configuration of the debugging system according to the third embodiment. FIG. 14 is a flowchart showing instruction processing steps of the debugging system according to the third embodiment. FIG. 15 is a view showing a display example of an instruction execution result by the debugging system according to the third embodiment.

A computer used in the embodiment has a similar configuration to the computer 1 of FIG. 1. A processor having a built-in a cache memory subject to debugging has the same configuration as the processor 100 shown in FIG. 2. It is assumed that data stored in the cache memory built in the processor of the embodiment is the same as the data stored in the cache memory 300 shown in FIGS. 4 and 5.

In the embodiment, data corresponding to an inputted memory address is read from the cache memory and from a main memory. The pieces of data read from the cache memory and the main memory are compared with each other, and the comparison result is displayed.

As shown in FIG. 13, a debugging system 12 has a configuration in which a debugging program is installed in and executed by the computer 1 of FIG. 1.

The debugging system 12 is equipped with the instruction/address inputting unit 20, the cache memory configuration information inputting unit 30, and the address converter 40. The debugging system 12 is further equipped with the cache memory reading unit 50, a main memory reading unit 80, a read data comparing unit 90, and the cache memory display unit 60.

The instruction/address inputting unit 20 receives a memory address of the main memory 500 of the processor system 2a subject to debugging shown in FIG. 2 as designation address information and an instruction for an operation for debugging. The cache memory configuration information inputting unit 30 of FIG. 13 receives the cache memory configuration information 600 of the cache memory 300 of FIG. 2.

The address converter 40 converts the inputted memory address to cache memory access address information by using the cache memory configuration information 600. The cache memory reading unit 50 accesses to the cache memory 300 of FIG. 2 by use of the obtained cache memory access address information. If data is stored in the accessed cache memory 300, the cache memory reading unit 50 reads the stored data.

The main memory reading unit 80 accesses the main memory 500 on the basis of the inputted memory address, and reads stored data. The read data comparing unit 90 compares the data read by the cache memory reading unit 50 and the data read by the main memory reading unit 80.

The cache memory display unit 60 displays information on presence or absence of data at the time of access to the cache memory 300 of FIG. 2 with the cache memory access address information. The cache memory display unit 60 further displays the comparison result obtained by comparing the data read from the main memory 500 and the data read from the cache memory 300 when the data exists in the cache memory 300.

The processing steps to display the content of the cache memory 300 of FIGS. 2 and 4 with the debugging system 12 of the embodiment will be described.

In FIG. 14, the instruction/address inputting unit 20 of the debugging system 12 of FIG. 13 inputs an instruction to read and display the data in the cache memory 300 and compare the data in the cache memory 300 and the main memory 500. In addition, the instruction/address inputting unit 20 inputs the memory address of the main memory 500 as the designation address information to display the data in the cache memory 300 (step S120).

An instruction from the cache memory configuration information inputting unit 30 of FIG. 13 causes the cache memory configuration information 600 to be read from a database. In accordance with the cache memory configuration information 600, the inputted memory address is converted to cache memory access information (tag address, index address, and offset address) by the address converter 40 (step S200).

The debugging system 12 performs an operation of accessing to and reading data in the cache memory 300 of FIGS. 2 and 4 by using the cache memory access information obtained from the address converter 40 (step S300).

In a similar manner to the first embodiment, the cache memory reading unit 50 of FIG. 13 compares values of two tag addresses inputted to the tag address comparator circuit 350 of the cache memory 300 of FIG. 4. From the comparison result, the cache memory reading unit 50 checks whether the access to the cache memory 300 results in a cache hit (step S400).

If the two tag addresses do not match and therefore the access to the cache memory 300 results in a cache miss, the processing proceeds to step S520. If the two tag addresses match and the access to the cache memory 300 results in a cache hit, the processing proceeds to step S700.

If the access to the cache memory 300 does not result in a cache hit, the debugging system 12 of FIG. 13 causes the cache memory display unit 60 to display that data corresponding to the memory address designated by the instruction is not on the cache memory 300, in step S520. Along with the display, the processing of the instructions to read and display the data from the cache memory 300 and to compare the data in the cache memory 300 and the main memory 500 is terminated.

On the other hand, if the access to the cache memory 300 results in a cache hit, the debugging system 12 causes the main memory reading unit 80 to read the data corresponding to the memory address inputted from the instruction/address inputting unit 20 from the main memory 500, in step S700.

The read data comparing unit 90 of FIG. 13 compares data read by the cache memory reading unit 50 and the data read by the main memory reading unit 80 (step S800). If the data match as a result of the comparison, the processing proceeds to step S620. If the data do not match, the processing proceeds to step S630.

If the data match, the debugging system 12 causes the cache memory display unit 60 to display the memory address designated by the instruction, in step S620. Further, the debugging system 12 displays the data stored in the memory address of the cache memory 300 and displays that the data in the cache memory 300 and the data in the main memory 500 match (not a hazard state). Along with the display, the processing of the instructions to read and display the data from the cache memory 300 and to compare the data in the cache memory 300 and the main memory 500 is terminated.

On the other hand, if the data do not match, the debugging system 12 causes the cache memory display unit 60 to display the main memory address designated by the instruction, in step S630. Further, the debugging system 12 displays the data stored in the memory address of the cache memory 300 and displays that the data in the cache memory 300 and the data in the main memory 500 do not match (hazard state). Along with the display, the processing of the instructions to read and display the data from the cache memory 300 and to compare the data in the cache memory 300 and the main memory 500 is terminated.

FIG. 15 is the display example of the instruction execution result by the debugging system 12 of the embodiment. The display example is a display example of the case where the data corresponding to the designated memory address exists in the cache memory 300. A display region 15A displays the memory address "0x10300022." Further, a display region 15 displays the data corresponding to the memory address. In the example, one-line data in the memory cell unit 340 of the cache memory 300 shown in FIG. 5 are collectively displayed simultaneously in two lines. A piece of data "0x00" designated by the offset address is highlighted in a display region 15B.

A display region 15D of FIG. 15 shows the presence or absence of a hazard state. In the case of a hazard state, a check mark is displayed for "Hazard" in a box 15E of the display region 15D. In the display example, the check mark indicates the hazard state in which the piece of data corresponding to the memory address in the cache memory 300 does not match the piece of data indicating the memory address in the main memory 500. The contents of the display of FIG. 15 are examples. Other expressions may be used as long as it is shown that the access to the cache memory results in a cache hit, the accessed data is "0x00," and the data read from the cache memory 300 do not match the data corresponding to the same memory address of the main memory 500.

According to the third embodiment described above, the displaying of the content of the cache memory 300 can be performed by designating the memory address. Thus, a debugging process of a program in consideration of data stored in the cache memory 300 can be performed in a similar manner to a debugging process of an object program loaded and developed on the main memory 500.

When the data in the cache memory 300 is checked, a complex conversion from configuration information of the cache memory 300 to the tag address, the index address or the like, and a comparison process of addresses do not need to be performed. Thus, the efficiency of the debugging process is improved.

Due to limitations in circuit size and power consumption, an embedded processor system, in particular, sometimes is not equipped with a circuit that manages and maintains coherency between data in a main memory and data read into a cache memory of the processor when the data is written into the main memory from a peripheral circuit or the like other than the processor.

In this case, due to a failure, a mismatch between the data in the cache memory and the main memory, which should match, may cause the hazard state. In the embodiment, display of the presence or absence of the mismatch and display of the data in the cache memory can be performed simultaneously. Thus, data analysis at the time of a failure is made easier, and the efficiency of the debugging process is improved.

One example is a failure in an access control program to access the main memory from the peripheral circuit or the like. Another example is a failure in program processing in the case where the processor writes data such as an arithmetic result by employing control steps of writing only in the high-speed cache memory and then writing back from the cache memory to the main memory which are executed by a program.

Figure 16:
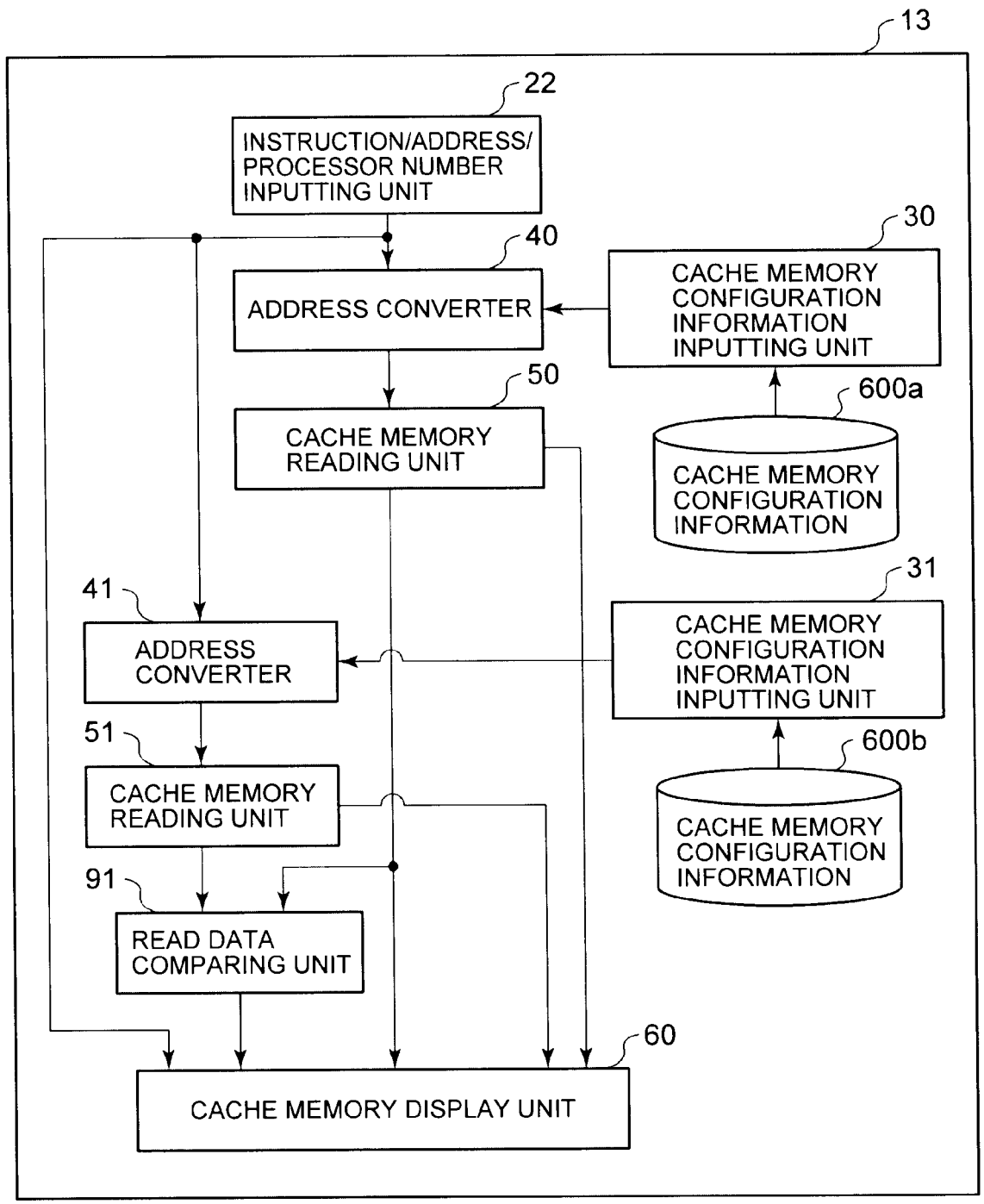
FIG. 16 is a block diagram showing a fourth embodiment of the debugging system according to the invention.
Figure 17:
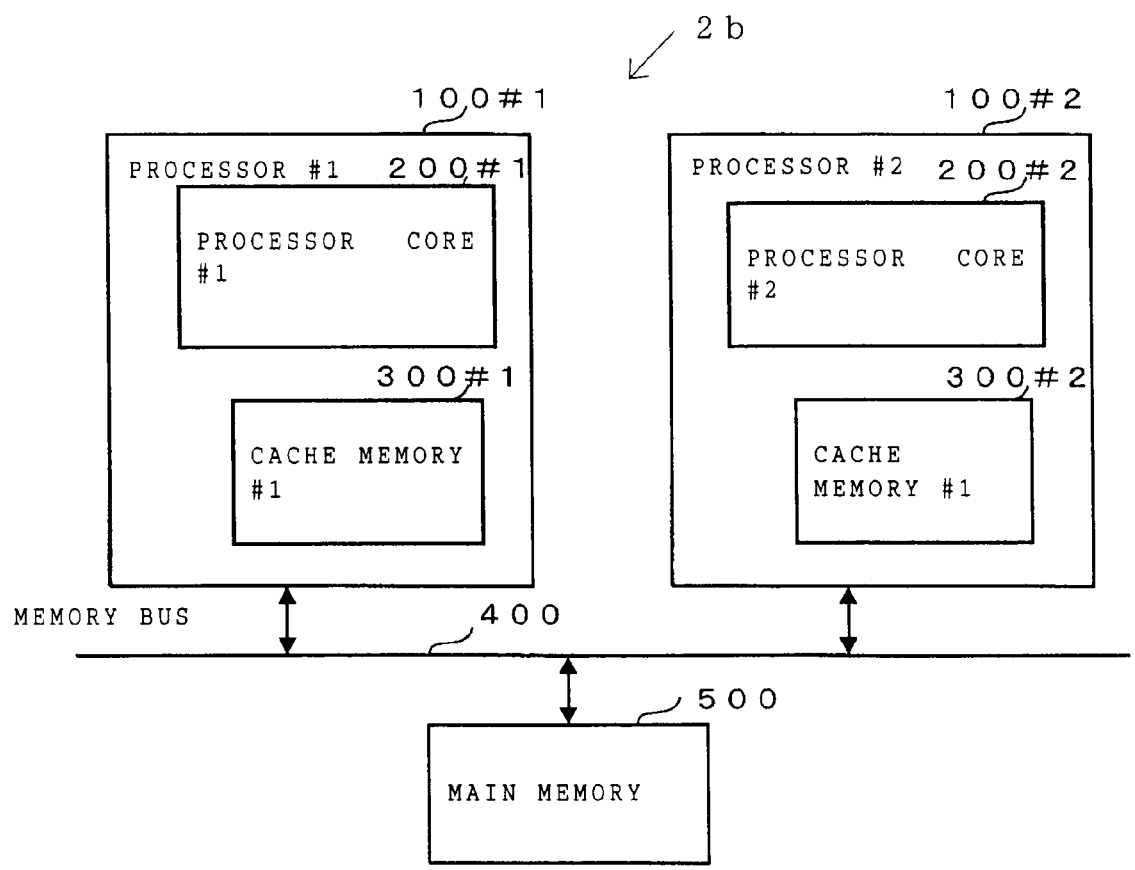
FIG. 17 is a block diagram showing a configuration of a processor system subject to debugging by the debugging system according to the fourth embodiment.
Figure 18:
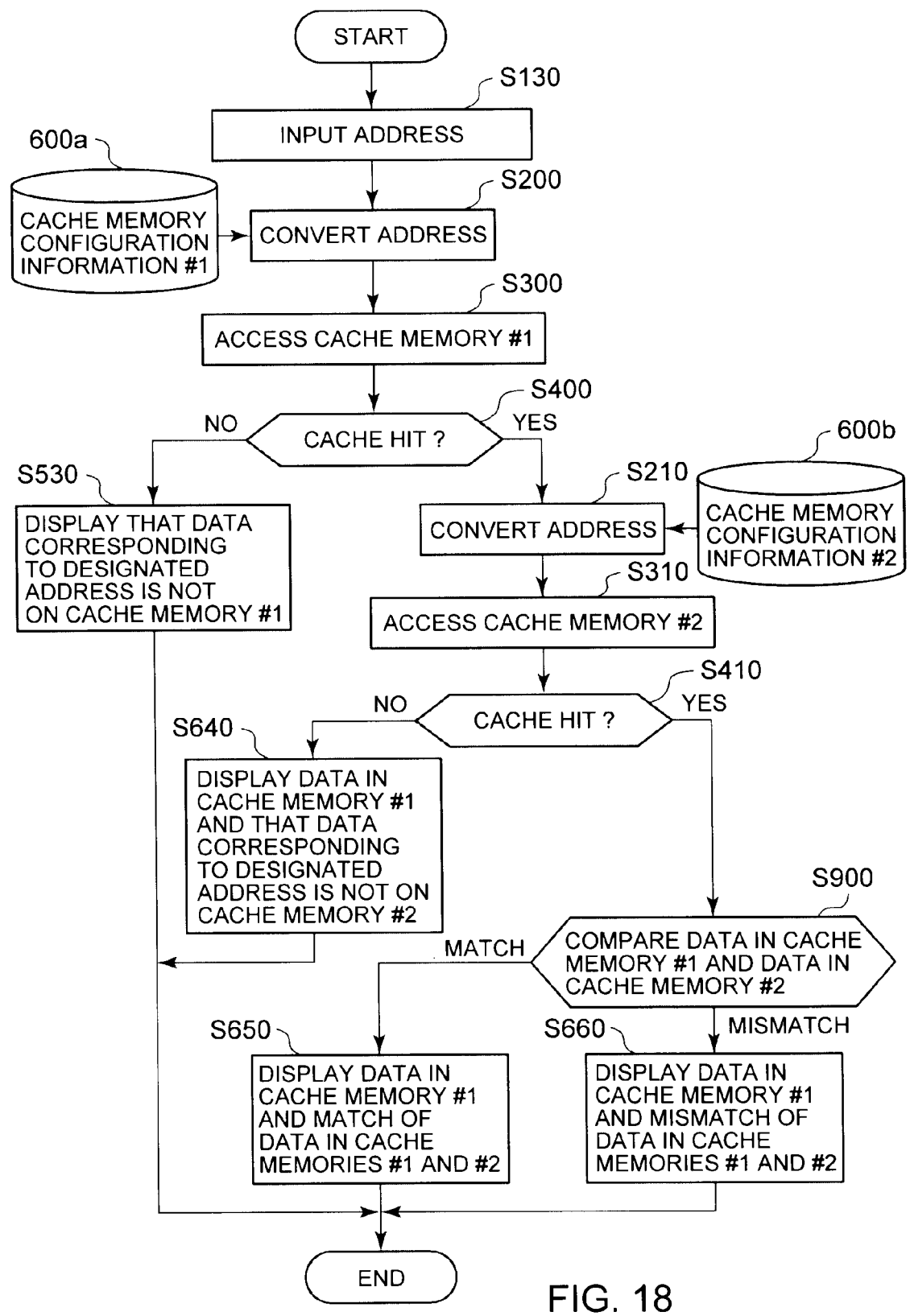
FIG. 18 is a flowchart showing instruction processing steps of the debugging system according to the fourth embodiment.

A debugging system according to a fourth embodiment of the invention will be described with reference to FIGS. 1, 4, 5, and 16 to 20. FIG. 16 is a block diagram showing a configuration of a debugging system 13 according to the fourth embodiment. FIG. 17 is a block diagram showing a configuration of a processor system subject to debugging by the debugging system according to the fourth embodiment. FIG. 18 is a flowchart showing instruction processing steps of the debugging system according to the fourth embodiment.

Figure 19:
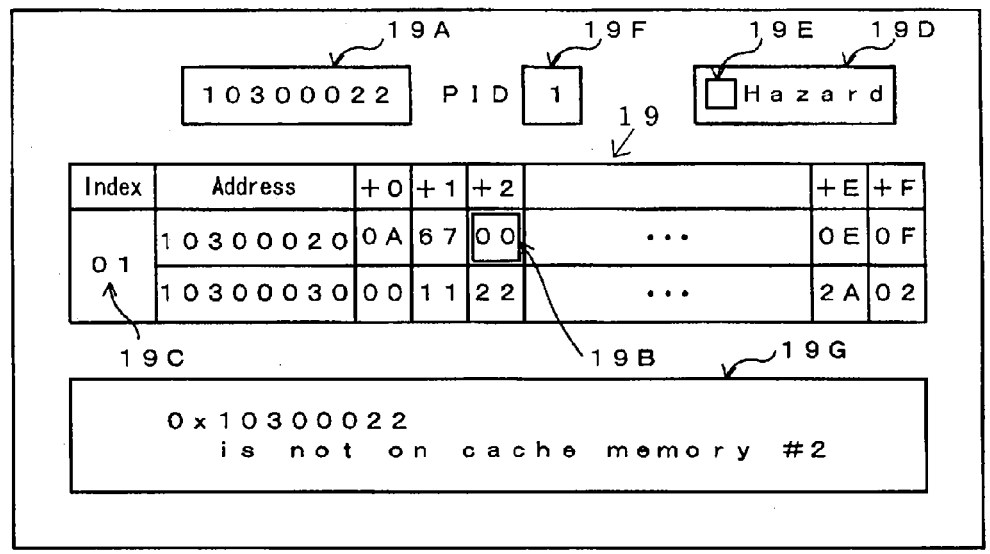
FIG. 19 is a view showing a display example of an instruction execution result by the debugging system according to the fourth embodiment.
Figure 20:
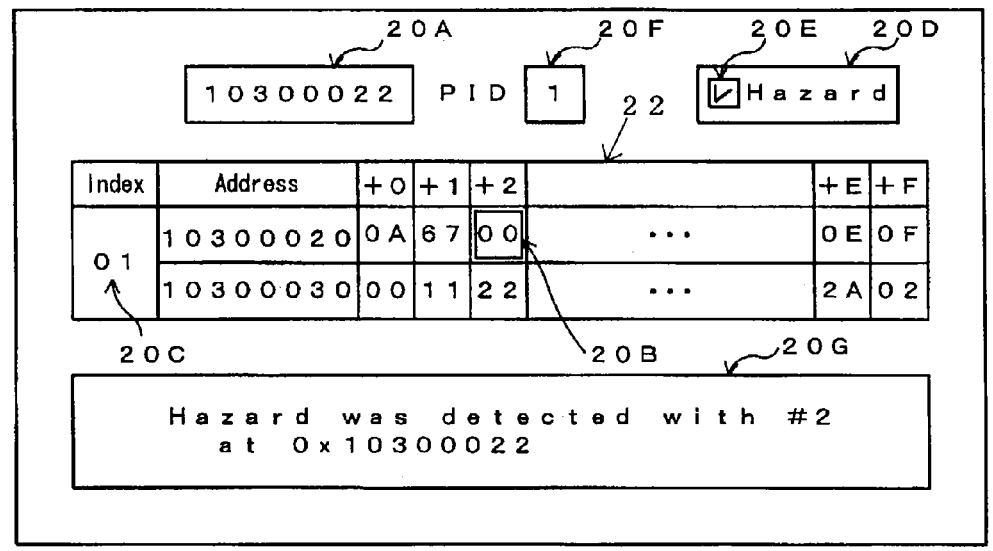
FIG. 20 is a view showing a display example of the instruction execution result by the debugging system according to the fourth embodiment.

FIG. 19 is a view showing a display example of an instruction execution result by the debugging system according to the fourth FIG. 20 is a view showing a display example of the instruction execution result by the debugging system according to the fourth embodiment.

A processor 100#1 having a processor number 1 and a processor 100#2 having a processor number 2 that are shown in FIG. 17 and respectively equipped with built-in cache memories subjected to debugging have the same configurations as the processor 100 of FIG. 2. It is assumed that data stored in a cache memory 300#1 built in the processor 100#1 is the same as the data stored in the cache memory 300 built in the processor 100 of FIG. 2.

The debugging system of the embodiment performs instruction processing of displaying the content of the cache memory of the processor having a designated number. In the instruction processing, data is read from the cache memory of the processor having the inputted number, on the basis of an inputted memory address. In the instruction processing, data is also read from the cache memory of the processor having a different number from the inputted number. The read pieces of data are compared. The comparison result of the data is displayed.

The debugging system 13 of FIG. 16 has a configuration in which a debugging program is installed in and executed by the computer 1 of FIG. 1.

The debugging system 13 is equipped with an instruction/address/processor number inputting unit 22, address converters 40, 41, cache memory configuration information inputting units 30, 31, cache memory reading units 50, 51, a read data comparing unit 91, and the cache memory display unit 60. The instruction/address/processor number inputting unit 22 may be divided into an instruction inputting unit, an address inputting unit, and a processor number inputting unit.

In FIG. 17, a processor system 2b is equipped with the processors 100#1, 100#2. The processors 100#1, 100#2 are respectively equipped with processor cores 200#1, 200#2 and cache memories 300#1, 300#2. The memory bus 400 connects between the main memory 500 and the processors 100#1, 100#2.

The instruction/address/processor number inputting unit 22 of FIG. 16 receives a processor number 1 or 2 as information to designate the processor 100#1 or the processor 100#2 subject to debugging shown in FIG. 17, the memory address of the main memory 500 of the processor system 2b, for example, as designation address information, and an instruction for an operation for debugging. The address converters 40, 41 respectively have functions to convert address information inputted respectively to the address converters 40, 41 to pieces of cache memory access address information by using cache memory configuration information 600a, 600b stored in databases corresponding to the processors 100#1, 100#2 of FIG. 17. Therefore, the pieces of cache memory configuration information 600a, 600b are inputted respectively to the address converters 40, 41 by the cache memory configuration information inputting units 30, 31.

The cache memory reading units 50, 51 access the cache memories 300#1, 300#2 respectively built in the processors 100#1, 100#2 with the pieces of the cache memory access address information obtained by the address conversion corresponding to the processors 100#1, 100#2, and if data exists in the cache memories 300#1, 300#2, read the stored data.

The read data comparing unit 91 compares the data read from the cache memory reading units 50, 51.

The cache memory display unit 60 displays information on presence or absence of data at the time of access to the cache memory 300#1 or 300#2 of the processor 100#1 or 100#2 corresponding to the processor number inputted to the instruction/address/processor number inputting unit 22 with the memory address inputted to the instruction/address/processor number inputting unit 22 and the cache memory access information obtained by the conversion.

Further, when the data exists in the cache memory 300#1 or 300#2, the cache memory display unit 60 displays the data read by the cache memory reading unit 50 or 51.

The cache memory display unit 60 displays information on presence or absence of data at the time of access to the cache memory 300#1 or 300#2 of the processor 100#1 or 100#2 corresponding to a processor number different from the processor number inputted to the instruction/address/processor number inputting unit 22 with the cache memory access information obtained by the conversion.

Further, the cache memory display unit 60 compares the data read by the cache memory reading unit 50 or 51 and the data read by the cache memory reading unit 51 or 50 when the data exists in the cache memory 300#2 or 300#1, and displays the comparison result.

The processing steps of displaying the content of the cache memory 300#1 of the processor 100#1 having the processor number 1 by the debugging system 13 of the embodiment will be described with reference to FIG. 18.

The instruction/address/processor number inputting unit 22 of the debugging system 13 shown in FIG. 16 receives "1," for example, as the processor number. The instruction/address/processor number inputting unit 22 receives an instruction for a debugging operation to display the content of the cache memory 300#1 built in the processor 100#1 of FIG. 17 and compare the data. Further, the instruction/address/processor number inputting unit 22 receives a memory address of the main memory 500 of FIG. 17 (step S130).

The cache memory configuration information inputting unit 30 of FIG. 16 reads the cache memory configuration information 600a of the cache memory 300#1 built in the processor 100#1 designated by the processor number "1." The cache memory configuration information 600a is inputted to the address converter 40 by the cache memory configuration information inputting unit 30. In accordance with the cache memory configuration information 600a, the address converter 40 converts the inputted memory address to cache memory access information (tag address, index address, and offset address) (step S200).

The cache memory reading unit 50 of FIG. 16 performs an access operation to read data from the cache memory 300#1 by using the cache memory access information obtained from the address converter 40 (step S300).

In the cache memory 300#1, values of two tag addresses inputted to a tag address comparator circuit of the cache memory 300#1 corresponding to the comparator circuit 350 of FIG. 4 are compared. From the comparison result, whether the access to the cache memory 300#1 results in a cache hit is checked (step S400).

If the two tag addresses do not match and therefore the access to the cache memory 300#1 results in a cache miss, the processing proceeds to step S530. If the two tag addresses match and therefore the access to the cache memory 300#1 results in a cache hit, the processing proceeds to step S210.

If the access to the cache memory 300#1 of the processor 100#1 having the designated processor number 1 does not result in a cache hit in step S530, the debugging system 13 causes the cache memory display unit 60 to display that data corresponding to the memory address designated by the instruction is not on the cache memory 300#1 of designated the processor 100#1.

Along with the display, the processing of the instruction for the following processes is terminated. The processes are reading the data from the cache memory 300#1 of the processor 100#1 having the designated processor number 1, reading data from the cache memory 300#2 of the processor 100#2 having the processor number 2 which has not been designated, and comparing the data of the two cache memories 300#1, 300#2.

If the access to the cache memory 300#1 of the processor 100#1 having the designated processor number 1 results in a cache hit, the cache memory configuration information inputting unit 31 of FIG. 16 reads the cache memory configuration information 600b of the cache memory 300#2 built in the processor 100#2 having the processor number 2 different from the processor number 1 designated by the instruction.

In accordance with the read cache memory configuration information 600b, the inputted memory address is converted to cache memory access information (tag address, index address and offset address) by the address converter 41 (step S210).

The debugging system 13 performs an access operation to read the data from the cache memory 300#2 by using the cache memory access information obtained from the address converter 41 (step S310).

In the cache memory 300#2 of FIG. 16, values of two tag addresses inputted to a tag address comparator circuit of the cache memory 300#2 corresponding to the comparator circuit 350 of FIG. 4 are compared. From the comparison result, whether the access to the cache memory 300#2 results in a cache hit is checked (step S410).

If the two tag addresses do not match and therefore the access to the cache memory 300#2 results in a cache miss, the processing proceeds to step S640. If the two tag addresses match and therefore the access to the cache memory 300#2 results in a cache hit, the processing proceeds to step S900.

If the access to the cache memory 300#2 of the processor 100#2 having the processor number 2 different from the designation does not result in a cache hit in step S640, the debugging system 13 causes the cache memory display unit 60 of FIG. 16 to display the processor number 1 designated by the instruction and the main memory address. This is because the access to the cache memory 300#1 of the processor 100#1 having the designated processor number 1 has resulted in a cache hit. The debugging system 13 causes the cache memory display unit 60 to display data stored in an address of the cache memory 300#1 corresponding to the memory address, and furthermore to display that data corresponding to the memory address designated by the instruction is not on the cache memory 300#2 of the processor having the processor number 2 different from the designation.

Along with the display, the processing of the instruction of the following processes is terminated. The processes are reading and displaying the data from the cache memory 300#1 of the processor having the designated processor number 1, and comparing the data in the cache memories 300#1, 300#2 of the processors having the processor numbers 1, 2.

In step S900, the debugging system 13 of FIG. 16 causes the read data comparing unit 91 to compare the data (data in the cache memory 300#1) read by the cache memory reading unit 50 and data (data in the cache memory 300#2) read by the cache memory reading unit 51. If the data match as a result of the comparison by the read data comparing unit 91, the processing proceeds to step S650. If the data do not match, the processing proceeds to step S660.

If the data stored in the cache memories 300#1, 300#2 of the processors 100#1, 100#2 corresponding to the designated memory address match in step S650, the debugging system 13 causes the cache memory display unit 60 to display "1" which is the processor number designated by the instruction and the memory address.

The debugging system 13 causes the cache memory display unit 60 to display the data stored in the cache memory 300#1 corresponding to the memory address, and moreover to display that the data in the cache memory 300#1 and the data in the cache memory 300#2 match (not a hazard state).

Along with the display, the processing of the instruction of the following processes is terminated. The processes are reading and displaying the data from the cache memory 300#1 of the processor 100#1 having the designated processor number 1 and comparing the data in the cache memories of the processors 100#1, 100#2 having the processor numbers 1, 2.

If the data stored in regions having addresses of the cache memories of the processors 100#1, 100#2 corresponding to the designated memory address do not match in step S660, the debugging system 13 causes the cache memory display unit 60 to display the memory address and "1" which is the processor number designated by the instruction.

The debugging system 13 causes the cache memory display unit 60 to display the data stored in the address of the cache memory 300#1 corresponding to the memory address.

Further, the debugging system 13 causes the cache memory display unit 60 to display that the data in the cache memory 300#1 and the data in the cache memory 300#2 do not match (hazard state).

Along with the display, the processing of the instruction of the following processes is terminated. The processes are reading and displaying the data from the cache memory 300#1 of the processor 100#1 having the designated processor number 1 and comparing the data in the cache memories 300#1, 300#2 of the processors 100#1, 100#2.

FIGS. 19 and 20 are display examples of the execution result of the instruction. FIG. 19 is a display example of a case where a piece of data corresponding to a designated memory address is stored and therefore a cache hit occurs in the cache memory 300#1 of the processor 100#1 having the inputted processor number 1. In addition, FIG. 19 is also a display example of a case where a piece of data corresponding to the inputted memory address is not stored and therefore a cache miss occurs in the cache memory 300#2 of the processor 100#2 having the processor number 2 different from the inputted processor number 1.

In FIG. 19, a display region 19A displays "ox10300022" as the designated memory address. A display region 19F displays the processor number "1."

A display region 19 of FIG. 19 collectively displays one-line data sets of the cache memory 300#1 each corresponding to one-line data of the data unit 330 of FIG. 5. In a display region 19B within the display region 19, a piece of data "0x0" designated by the offset address is highlighted.

Further, a message, which shows that a piece of data corresponding to the memory address "0x10300022" does not exist in the cache memory 300#2 of the processor 100#2 that is not designated, is displayed in a display region 19G. The contents of the display are examples. Other expressions may be used as long as the content shows that the access to the cache memory of the processor having the designated processor number results in a cache hit, the stored piece of data is "0x00," and the access to the cache memory of the processor having the processor number which is not designated results in a cache miss.

FIG. 20 is a display example of a case where data corresponding to an inputted memory address exists in each of the cache memory 300#1 of the processor 100#1 having the processor number 1 and the cache memory 300#2 of the processor 100#2 having the processor number 2, the access results in a cache hit, and values of the data read from each of the two cache memories 300#1, 300#2 are different.

In FIG. 20, a display region 20A displays the designated memory address "0x10300022." A display region 20F displays the processor number "1." In a display region 22, data, which includes a piece of data corresponding to the memory address, is displayed. The display region 22 collectively displays one-line data sets of the cache memory 300#1 simultaneously. In a display region 20B within the display region 22, a piece of data "0x00" designated by an offset address is highlighted. In a display region 20C, an index address is displayed. In a display region 20G, it is displayed that, although a piece of data corresponding to the designated memory address also exists in the cache memory 300#2 which is not designated, the two pieces of the data obtained from the cache memories 300#1, 300#2 do not match to show a hazard state. Specifically, a symbol indicating a check is displayed in a frame (display region) 20E within a display region 20D to show the hazard state. The processor number of the hazard occurrence is displayed in a display region (message field) 20G. The contents of the display are examples. Other expressions may be used as long as the content shows that the accesses to the cache memories of the processors with the designated memory address result in cache hits, the data in the cache memory of the processor having the designated processor number is "0x00," and this results in a hazard state where a value of the data read by the access to the cache memory of the processor having a different processor number from the designated processor number differs from that of the data in the cache memory of the processor having the designated processor number.

According to the embodiment described above, the display of the content of the cache memory can be performed by designating the memory address. The debugging process of a program in consideration of data stored in the cache memory can be performed in a similar manner to a debugging process of an object program loaded and developed on the main memory. When the data in the cache memory is checked, a complex conversion from configuration information of the cache memory to the tag address, the index address or the like and a comparison process of addresses do not need to be performed by a person. Thus, the efficiency of the debugging process is improved.

In many cases, for the purposes of suppressing increases in hardware size, power consumption and the like, a built-in processor system, in particular, is not equipped with a circuit that manages and maintains coherency among processors regarding data stored in cache memories of the processors. In such cases, when processors operate in parallel while sharing data on a main memory, a mismatch of data between the cache memories of the processors, which should normally match, due to a failure of a program or a difference in processing procedures of the processors may cause a hazard state. In the embodiment, display of the presence or absence of the mismatch and the content of the cache memory can be performed simultaneously. Thus, data analysis in a state of parallel operations by the processors is made easier, and the efficiency of the debugging process is improved.

In the debugging system 13 of the embodiment, the number of the processor subject to comparison with the processor 100#1 is one. The subject of the comparison may be all of processors connected to the memory bus 400 of FIG. 17 and having a built-in cache memory. The processors and the cache memories may have different configurations.

In the debugging system of the embodiments described above, display of the data in the cache memory is performed by an instruction. After the display of the data, an update instruction may be inputted in a similar manner to a conventional debugging system so that the displayed data is rewritten to a designated value. Accordingly, data read by the cache memory can be rewritten to an arbitrary value. Thus, for example, it becomes possible to change an expected value of data which is estimated as inappropriate, to restart a simulation, and to check the simulation result. Thus, the efficiency of debugging process is improved.

In the debugging system of the embodiments described above, data stored in the cache memory can be read through the state storage unit of the simulator. Instead, in a processor that enables the access to the cache memory with a special instruction or the like, the data stored in the cache memory may be read with an access method using the special instruction or the like.

Accordingly, programs or processing steps for conversion from a format used for storing data in the state storage unit of the simulator become unnecessary, and the reliability of the debugging system can be improved as a result.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A debugging system for debugging a program executed in a processor system equipped with a main memory, a processor equipped with a cache memory having a memory cell unit, and a bus to connect the processor and the main memory, the memory cell unit being capable of storing first tag addresses and data in association with first index addresses, respectively, the first index addresses being configured based on address information, the first tag addresses being configured based on the address information, the debugging system comprising:
an inputting unit to receive designation address information to designate an address of data to be read, the inputting unit receiving an instruction to instruct an operation for debugging;
a cache memory configuration information inputting unit to receive configuration information of the cache memory;
an address converter to convert the designation address information to a second index address and a second tag address on the basis of the configuration information received by the memory configuration information inputting unit;
a cache memory reading unit equipped with a first decoder, a comparator and a reader, the first decoder being configured to access to the memory cell unit in reference to the second index address obtained from the address converter, the comparator being configured to compare the second tag address with one of the first tag addresses stored in the memory cell unit and selected by the first decoder, the reader configured to read one of the data corresponding to the one of the first tag addresses stored in the memory cell unit and selected by the first decoder; and
a cache memory display unit configured to display at least the designation address information and the one of the data read from the cache memory,
wherein the cache memory reading unit is configured to read one of the data corresponding to the one of the first tag addresses stored in the memory cell unit and selected by the first decoder, when the one of the first tag addresses stored in the memory cell unit and the second tag address match as a result of comparison by the comparator so that the access to the cache memory results in a cache hit.

2. The debugging system according to claim 1, wherein the address converter generates a second offset address based on the designation address information and inputs the second offset address to the reader,
the reader outputs one piece which is designated selectively from among pieces of one of the data in association with the first index address by the second offset address.

3. The debugging system according to claim 1, wherein, when the access to the cache memory does not result in a cache hit, the cache memory display unit displays the designation address information, and displays that data corresponding to the designation address information is not stored in the cache memory.

4. The debugging system according to claim 1, further comprising:
a main memory reading unit; and
a read data comparing unit, wherein
the main memory reading unit reads data from the main memory in reference to the designation address information inputted to the inputting unit, and
the read data comparing unit compares the data read from the main memory and the data read from the cache memory.

5. The debugging system according to claim 4, wherein the address converter generates a second offset address based on the designation address information and inputs the second offset address to the reader, and
the reader outputs one piece which is designated selectively from among pieces of one of the data in association with the first index address by the second offset address.

6. The debugging system according to claim 4, wherein the cache memory display unit displays the designation address information and displays that data corresponding to the designation address information is not stored in the cache memory, when the access to the cache memory does not result in a cache hit.

7. The debugging system according to claim 4, wherein the cache memory display unit displays the one of the data of the cache memory when the read data comparing unit determines that the data read from the main memory matches the data read from the cache memory, and the cache memory display unit displays a mismatch when the read data comparing unit determines that the data read from the main memory does not match the data read from the cache memory.

8. The debugging system according to claim 1, wherein the designation address information is a memory address of the main memory.

9. The debugging system according to claim 1, wherein the designation address information includes at least one selected from a memory address, information corresponding to a symbol, a variable defined by a program, and a register number of the processor.

10. The debugging system according to claim 1, wherein the designation address information is information obtained by a calculation using a formula in which plural ones selected from a memory address, information corresponding to a symbol, a variable defined by a program, a register number of the processor or a constant number, are connected with each other by at least one operator.

11. The debugging system according to claim 1, further comprising:

a debug information inputting unit, wherein the designation address information is a symbol or a register number of the processor, the debug information inputting unit inputs debug information to the inputting unit, the debug information showing a correspondence between the designation address information and the symbol or the register number, and the inputting unit includes a function to convert the symbol to address information represented by a numerical value, by using the debug information.

12. The debugging system according to claim 11, wherein the cache memory display unit displays the symbol or the register number as the designation address information.

13. The debugging system according to claim 11, wherein the symbol is included in a source program and the debug information is obtained from a compiler to compile the source program.

14. The debugging system according to claim 1, wherein the first decoder takes as input the first index address having a first pre-determined number of bits and maps the first pre-determined number of bits to a second pre-determined number of bits and the first decoder selects a single row of the memory cell unit based on the input, the first tag address corresponding to the selected row being equal to the second tag address of the designation address information.

15. A debugging system for debugging a program executed in a processor system equipped with a main memory, a first processor equipped with a first cache memory having a first memory cell unit, a second processor equipped with a second cache memory having a second memory cell unit, and a bus to connect the first and second processors and the main memory, the first memory cell unit being capable of storing first tag addresses and first data in association with first index addresses, respectively, the first index addresses being configured based on address information, the first tag addresses being configured based on the address information, and the second memory cell unit being capable of storing second tag addresses and second data in association with second index addresses, respectively, the second index addresses being configured based on address information, the second tag addresses being configured based on the address information being used to configure the second index addresses, the debugging system comprising:

an inputting unit to receive information to designate the first processor as an processor to be debugged, designation address information to designate an address of a data to be read, and an instruction to instruct an operation for debugging;

first and second cache memory configuration information inputting units configured to receive first and second configuration information of the first and second cache memories, respectively;

first and second address converters configured to convert the designation address information to third and fourth index addresses and third and fourth tag addresses, respectively, on the basis of the first and second configuration information received by the first and second memory configuration information inputting units;

first and second cache memory reading units respectively equipped with first and second decoders, first and second comparators, and first and second readers, the first and second decoders being configured respectively to access to the first and second memory cell units in reference to the third and fourth index addresses obtained from the first and second address converters, the first and second comparators being configured respectively to compare the third and fourth tag addresses with respective ones the first and second tag addresses stored in the first and second memory cell units and selected by the first and second decoders, and the first and second readers being configured respectively to read respective ones of the first and second data corresponding to the respective ones of the first and second tag addresses stored in the first and second memory cell units and selected by the first and second decoders;

a read data comparing unit configured respectively to compare the respective ones of the first and second data read from the first and second readers; and a cache memory display unit configured to display at least the designation address information and the one of the first data read from the first cache memory, wherein the first cache memory reading unit is configured to read one of the data corresponding to the one of the first tag addresses stored in the first memory cell unit and selected by the first decoder, when the one of the first tag addresses stored in the first memory cell unit and the third tag address match as a result of comparison by the first comparator so that the access to the first cache memory results in a cache hit.

16. The debugging system according to claim 15, wherein the first and second address converters generate third and fourth offset addresses respectively based on the designation address information, and input the third and fourth offset addresses to the first and second readers respectively and the first and second readers selectively output one pieces which are designated from among pieces of ones of the first and second data in association with the first and second addresses by the third and fourth offset addresses, respectively.

17. The debugging system according to claim 15, wherein the cache memory display unit displays the designation address information and displays that a data corresponding to the designation address information is not stored in the first cache memory, when the access to the first cache memory does not result in a cache hit.

18. The debugging system according to claim 15, wherein
the fourth index address is obtained from the second address converter to access the second memory cell unit when the access to the first cache memory results in a cache hit, and
the cache memory display unit displays the designation address information and displays that a data corresponding to the designation address information is not stored in the second cache memory when the access to the second memory cell unit does not result in a cache hit.

19. The debugging system according to claim 15, wherein,
the fourth index address is obtained from the second address converter to access the second memory cell unit when an access to the first cache memory results in a cache hit, and
the read data comparing unit compares respective ones of the first and second data read from the first and second readers, respectively when the access to the second memory cell unit results in a cache hit.

20. The debugging system according to claim 19, wherein the cache memory display unit displays the designation address information, the one of the first data, and at least one of a match of the data and a mismatch of the data, based on the result of comparison of the respective ones of the first and second data performed by the read data comparing unit.

* * * * *